(12) United States Patent
Tsirtsis et al.

(10) Patent No.: US 7,349,369 B2
(45) Date of Patent: *Mar. 25, 2008

(54) METHODS AND APPARATUS FOR USING A PAGING AND LOCATION SERVER TO SUPPORT SESSION SIGNALING

(75) Inventors: George Tsirtsis, London (GB); Alan O'Neill, Henley Beach (AU)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/178,961

(22) Filed: Jul. 11, 2005

(65) Prior Publication Data

US 2005/0243766 A1  Nov. 3, 2005

Related U.S. Application Data

(63) Continuation of application No. 10/322,356, filed on Dec. 18, 2002, now Pat. No. 6,954,442, which is a continuation-in-part of application No. 10/167,668, filed on Jun. 11, 2002, now Pat. No. 6,970,445.

(60) Provisional application No. 60/298,283, filed on Jun. 14, 2001, provisional application No. 60/369,016, filed on Apr. 1, 2002, provisional application No. 60/370,524, filed on Apr. 5, 2002, provisional application No. 60/313,035, filed on Aug. 16, 2001.

(51) Int. Cl.
H04Q 7/00 (2006.01)
H04J 3/24 (2006.01)
G06F 15/16 (2006.01)

(52) U.S. Cl. .................. 370/328; 370/349; 455/435.1; 709/227

(58) Field of Classification Search ............. 370/310.2, 370/328, 315–316, 331, 338, 349; 455/432.1–445; 709/227–229, 238, 242

See application file for complete search history.

(56) References Cited

U.S. PATENT DOCUMENTS 5,200,952 A  4/1993 Bernstein et al.
(Continued)

FOREIGN PATENT DOCUMENTS

EP  1244261 A2  9/2002
WO  PCT/US98/47302  10/1998

OTHER PUBLICATIONS

C. Perkins, Editor "IP Mobility Support", Network Working Group, pp. 1-79 (Oct. 1996).

(Continued)

*Primary Examiner*—Chi Pham
*Assistant Examiner*—Tri H. Phan
(74) *Attorney, Agent, or Firm*—Straub & Pokotylo; Michael P. Straub; Ronald P. Straub

(57) ABSTRACT

Session signaling register message transmission methods and apparatus well suited for use in a communication system which supports mobile nodes capable of moving between domains and access nodes in a domain are described. Broadcasting of session signaling register messages is supported to reduce the number of registration messages which need to be transmitted between a mobile node and an access node. A paging and location server is used to reduce the number of session signaling register messages transmitted between domains. A visiting node registers with a paging and location server. The session signaling address of the paging and location server being used by a visiting mobile node is registered with the visiting node's home session signaling server. As the visiting node moves between access nodes in the visited domain the paging and location server it uses remains the same eliminating the need to update the home session signaling servers.

24 Claims, 13 Drawing Sheets

U.S. PATENT DOCUMENTS

| | | | |
|---|---|---|---|
| 5,210,787 | A | 5/1993 | Hayes et al. |
| 5,229,992 | A | 7/1993 | Jurkevich et al. |
| 5,247,516 | A | 9/1993 | Bernstein et al. |
| 5,251,209 | A | 10/1993 | Jurkevich et al. |
| 6,078,575 | A | 6/2000 | Dommety et al. |
| 6,161,008 | A | 12/2000 | Lee et al. |
| 6,195,705 | B1 | 2/2001 | Leung |
| 6,366,561 | B1 | 4/2002 | Bender |
| 6,366,577 | B1 | 4/2002 | Donovan |
| 6,438,114 | B1 | 8/2002 | Womack |
| 6,446,127 | B1 | 9/2002 | Schuster et al. |
| 6,477,150 | B1 | 11/2002 | Maggenti et al. |
| 6,487,407 | B2 | 11/2002 | Goldberg et al. |
| 6,571,095 | B1 | 5/2003 | Koodli |
| 6,611,547 | B1 | 8/2003 | Rauhala |
| 6,615,236 | B2 | 9/2003 | Donovan |
| 6,650,901 | B1 | 11/2003 | Schuster |
| 6,678,735 | B1 | 1/2004 | Orton et al. |
| 6,680,943 | B1 | 1/2004 | Gibson et al. |
| 6,725,036 | B1 | 4/2004 | Faccin et al. |
| 6,928,082 | B2 | 8/2005 | Liu et al. |
| 6,954,442 | B2 * | 10/2005 | Tsirtsis et al. ............... 370/328 |
| 6,970,445 | B2 | 11/2005 | O'Neill et al. |
| 2002/0024946 | A1 | 2/2002 | Jeong et al. |
| 2002/0037723 | A1 | 3/2002 | Roach |
| 2002/0122416 | A1 | 9/2002 | Xu et al. |
| 2002/0150091 | A1 | 10/2002 | Loppenen et al. |
| 2002/0152325 | A1 | 10/2002 | Elegebaly |
| 2003/0045276 | A1 | 3/2003 | Bondy et al. |
| 2003/0120813 | A1 | 6/2003 | Majumdar et al. |

OTHER PUBLICATIONS

Li, Yalun "Protocol Architecture for Universal Personal Computing" IEEE Journal on Selected Areas in Communications 15(8): 1467-1476 (1997).

J. Moy, Editor, "OSPF Version 2", Network Working Group, pp. 1-244 (Apr. 1998).

Valko, Andras "Cellular IP: A New Approach to Internet Host Mobility," Computer Communications Review 29(1): 50-65 (1999).

Andras G. Valko, "Cellular IP—A New Approach to Internet Host Mobility," ACM Computer Communication Review, vol. 29, No. 1, pp. 50-65, Jan. 1999.

TIA/EIS/IS-707A.8 "Data Service Options for Spread Spectrum Systems: Radio Link Protocol Type 2" pp. 1-1:4:12 (Mar. 1999).

Elin Wedlund et al., "Mobility Support Using SIP", Proc. Of ACM/IEEE International Conference on Wireless and Mobile Multimedia (WoWMoM '99), Seattle, Washington, Aug. 1999.

Henning Schulzrinne et al., "Application-Layer Mobility Using SIP", 0-7803-7133 IEEE, pp. 29-36, Jan. 2000.

"Source Specific Multicast (SSM) Explicit Multicast (Xcast)" pp. 1-27 (Copyright 2001 by ETRI).

Andrew T. Campbell et al., "IP Micro-Mobility Protocols", ACM SIGMOBILE Mobile Computer and Communication Review (MC2R), vol. 4, No. 4, pp. 34-54, Oct. 2001.

S. Zhou et al., "A Location Management Scheme for Mobility Support in Wireless IP Networks Using Session Initiation Protocol (SIP)", 1531-2216/01 IEEE, pp. 486-491, Oct. 2001.

"Source Specific Multicast (SSM) Explicit Multicast (Xcast)" pp. 1-27 (Copyright 2001 by ETRI).

IETF, Network Working Group, Request for Comments: 3261 "SIP: Session Initiation Protocol", pp. 1-269 (printed as pp. 1-252) (Jun. 2002).

* cited by examiner

METHODS AND APPARATUS FOR USING A PAGING AND LOCATION SERVER TO SUPPORT SESSION SIGNALING

RELATED APPLICATIONS

The present application is a continuation of pending U.S. patent application Ser. No. 10/322,356, filed on Dec. 18, 2002 now U.S. Pat. No. 6,954,442 and titled "METHODS AND APPARATUS FOR USING A PAGING AND LOCATION SERVER TO SUPPORT SESSION SIGNALING", which is a continuation-in-part of U.S. patent application Ser. No. 10/167,668, filed Jun. 11, 2002 now U.S. Pat. No. 6,970,445, which is titled "Methods and Apparatus For Supporting Session Signaling And Mobility Management in A Communications System" which claims the benefit of the following applications: U.S. Provisional Patent Application Ser. No. 60/298,283, filed on Jun. 14, 2001, titled "Location of SIP Proxy Server in Wireless Access Router"; U.S. Provisional Patent Application Ser. No. 60/369,016, filed on Apr. 1, 2002, titled: "Methods and Apparatus for Registration for SIP Services in Mobile Networks"; U.S. Provisional Patent Application Ser. No. 60/370,524, filed on Apr. 5, 2002, titled: "Methods and Apparatus for SIP Message Forwarding and Redirection"; and U.S. Provisional Patent Application Ser. No. 60/313,035, filed on Aug. 16, 2001, titled: "A Method for Controlling IP Applications During Network Changes that Result in Resource Shortages", each of the above mentioned patent applications is hereby expressly incorporated by reference.

FIELD OF THE INVENTION

The present invention is directed to methods and apparatus for establishing a data communication session and, more particularly, to methods and apparatus for establishing a data communication session through an access node in a multi-node network, e.g., a cellular network in which mobile end systems communicate with each other and other end systems through access nodes.

BACKGROUND

Internet Protocol (IP) technology is designed to enable packet-switched interconnection of a heterogeneous set of computers and communication networks. A potentially diverse set of network and link layer technologies are interconnected through nodes, e.g., gateways (or routers), that provide a packet forwarding service. Information is transferred between end nodes (or hosts) as blocks of data called datagrams, where source and destination hosts are identified by fixed length addresses. Routing in IP internetworks is connectionless in nature, in that datagrams are forwarded between routers on a hop-by-hop basis using the destination address in the datagram.

Mobile IP (Ref: IETF RFC 2002) enables an IP host, also called a "mobile node" in the context of Mobile IP, to dynamically change its point of attachment to the network, yet remain contactable via a previously given "home address". To achieve this a temporary local address or "care of address" is associated with the mobile node when it visits a foreign network. In some cases the care of address is that of a "foreign agent" that assists in this process, while in other cases the care of address may be directly assigned to the mobile node. The care of address is registered back on the home network in a node referred to as the "home agent". The home agent intercepts packets destined to the home address of the mobile node and redirects the packets, by means of encapsulation and tunneling, towards the care of address associated with mobile node in the visited network. Upon delivery to the care of address, the encapsulation is removed and the original packet destined to the home address is delivered to the mobile node.

The Session Initiation Protocol (SIP) (Ref: IETF RFC 2543) enables end nodes or users to establish data communication sessions. SIP is a client/server protocol consisting primarily of request and response message exchanges. A SIP transaction typically comprises a request/response pair. SIP uses application layer routing, wherein SIP messages sent between two "user agents" may traverse through intermediate processing nodes referred to as SIP servers. SIP user agents and servers determine the next SIP node to which each message should be directed based on inspection and processing of SIP message header fields. Once the next SIP node is determined, the message is forwarded to that SIP node using normal network layer routing mechanisms. An enterprise network or Internet Service Provider may use SIP servers to assist in, session establishment, enforce policies, or support user agent mobility. SIP mobility support mechanisms allow a user agent to maintain reachability by registering its present location information with a SIP server in its home network. This location information could either identify the location of the user agent or another SIP server to which request for the user agent should be sent (e.g., a SIP server in a visited network). The SIP server in the home network can then route any request for the user agent based on the presently registered location information.

Both a mobility management mechanism and a session establishment mechanism are required to support services such as Voice over IP in a cellular data network. FIG. 1 illustrates a system 100 based on a simple combination of Mobile IP and SIP. The system 100 is not necessarily prior art, but is useful for explaining Mobile IP and SIP for background purposes and therefore will be discussed here. The depicted system 100 comprises a plurality of access nodes 114, 126, where each access node 114, 126 provides connectivity to a plurality of N end nodes (160, 162), (164, 166), respectively, via corresponding access links (118, 120), (122, 124), respectively.

Interconnectivity between the access nodes 114, 126 is provided through network links 106, 108 and an intermediate network node 102. The network also includes a SIP server node 112 that is connected to the intermediate network node 102 by network link 110. The intermediate network node 102 also provides interconnectivity to another network 128 via network link 104, where the network 128 is the home network of end node X 162. The home network 128 includes a Mobile IPv4 home agent node 130 and a home SIP server node 132, each of which is connected to an intermediate network node 138 by one of two network links 134, 136, respectively. The intermediate network node 138 in the home network 128 also provides interconnectivity to network nodes that are external from the perspective of the home network 128 via network link 104. In the illustrated system 100, SIP servers 112 and 132 are physically distinct and remotely located from access nodes 114, 126 requiring external signaling between the housing of servers 112, 126 whenever either of the servers needs to interact with an access node 114, 126. As a result of the locations of server 112, 132 relative to access nodes 114, 126 undesirable delays may occur when a SIP server 112, 132 needs to interact with the elements of one of the access nodes 114, 126.

In the depicted system 100, end node X 162 uses Mobile IP to maintain reachability, while its present point of attachment to the network is through visited access node 114. End node X 162 has registered the address associated with a Mobile IPv4 foreign agent module 116 of the access node 114 as a care of address with its home agent 130 in its home network 128.

End node X 162 has also registered the location of a visited SIP server 112 with its home SIP server node 132 in its home network 128. Thus, the home SIP server 132 will direct SIP requests for end node X 162 to the visited SIP server 112. The dashed arrows show the path of a SIP request and response for a session initiated from end node Y 166 to end node X 162. End node Y 166 directs the initial request message 140 to the home SIP server 132 of end node X 162. The home SIP Server 132 subsequently directs a request message 142 to the visited SIP server 112 in accordance with the registered location information. Following reception of the request message 142 from the home SIP server 132, the visited SIP server 112 directs a request message 144 to the home address of end node X 162. This request message 144 is forwarded via normal network routing all the way back to the home network 128 of end node X 162, where it is intercepted by the home agent 130. The home agent 130 encapsulates the intercepted request message 144 and tunnels the encapsulated request message 146 to the foreign agent 116. Following reception of the encapsulated request message 146, the foreign agent 116 directs a request message 148 to end node X 162.

Following reception of the request message 148, end node X 162 sends a response to end node Y 166 such that the response traverses backwards through the same set of SIP intermediate servers that processed the request. This is accomplished in part by the fact that the information identifying the SIP servers 132, 112 through which the request traversed was added to the request message 142, 144 as it was forwarded. Thus, end node X 162 initially directs a response message 150 to the visited SIP server 112. The visited SIP Server 112 subsequently directs a response message 152 to the home SIP server 132. Following reception of the response message 152 from the visited SIP server 112, the home SIP server 132 directs a response message 154 to end node Y 166. However, the path of the response would be more circuitous in the case where Mobile IP operates in reverse tunneling mode (Ref: IETF RFC 2344). Although the alternate response signaling path is not shown in the figure, the following briefly describes the case when reverse tunneling is used. As opposed to being delivered directly to the visited SIP server 112, the response sent from end node X 162 would be encapsulated and tunneled to the home agent 130, where it would be decapsulated by the home agent 130 and directed back to the visited SIP server 112. Then from the visited SIP server 112, the SIP response signaling path would proceed as before, to the home SIP server 132, and finally to end node Y 166.

The depicted system 100 clearly illustrates the inefficient and circuitous forwarding of SIP request/response signaling associated with the establishment of a data communication session between end node Y 166 and end node X 162. System 100 also has several other deficiencies, particularly regarding session admission control, resource allocation, and mobility support. The primary difficulty with session admission control stems from the fact that the admission control and policy decision points do not coincide with the admission control and policy enforcement points. In particular, while the SIP servers 112, 132 process session establishment signaling and effectively serve as admission control and policy decision points, these servers 112, 132 are not on the path of session data traffic, and thus cannot be admission control and policy enforcement points. Note that data session traffic will not go through servers 112, 132 since these are only used for session signaling. Furthermore, since the SIP servers 112, 132 are not on the data path, they may be easily bypassed by the session signaling traffic provided that there are no additional control mechanisms. Admission control and policy enforcement can more effectively be applied in the access nodes 114,126, but this would require additional signaling between the SIP servers 112, 132 and the access nodes 114, 126 and greatly increase the complexity of the system 100. Similarly, with respect to resource allocation, since the SIP servers 112, 132 are not on the data path, the admission control decision cannot easily account for the availability of system resources to support the requested data communication session.

In a wireless communication system, information regarding the availability of resources at the access node 114, 126 and over the access links 118, 120, 122, 124 can be critical. Incorporation of access node and link resource availability information in the admission control decision in the system 100 would again require additional signaling between the SIP servers 112, 132 and the access nodes 114, 126 and again greatly increase the complexity of the system 100. Finally, supporting mobility in combination with all of the above signaling requires additional mechanisms to accommodate the movement of an end node 160, 162, 164, 166 during session establishment. In addition to increasing the complexity of the system 100, the use of additional signaling between the SIP servers 112, 132 and the access nodes 114, 126 to address these issues would also increase the latency associated with establishment of a data communication session and increase the bandwidth utilization on network links, thus reducing the practicality of the resultant system.

In view of the above discussion, it is apparent that there is a need for improved methods and apparatus for supporting end node mobility, communication session establishment and several other operations related to establishing and maintaining communications sessions in systems which use packets to transmit data.

SUMMARY OF THE INVENTION

Figure 1:
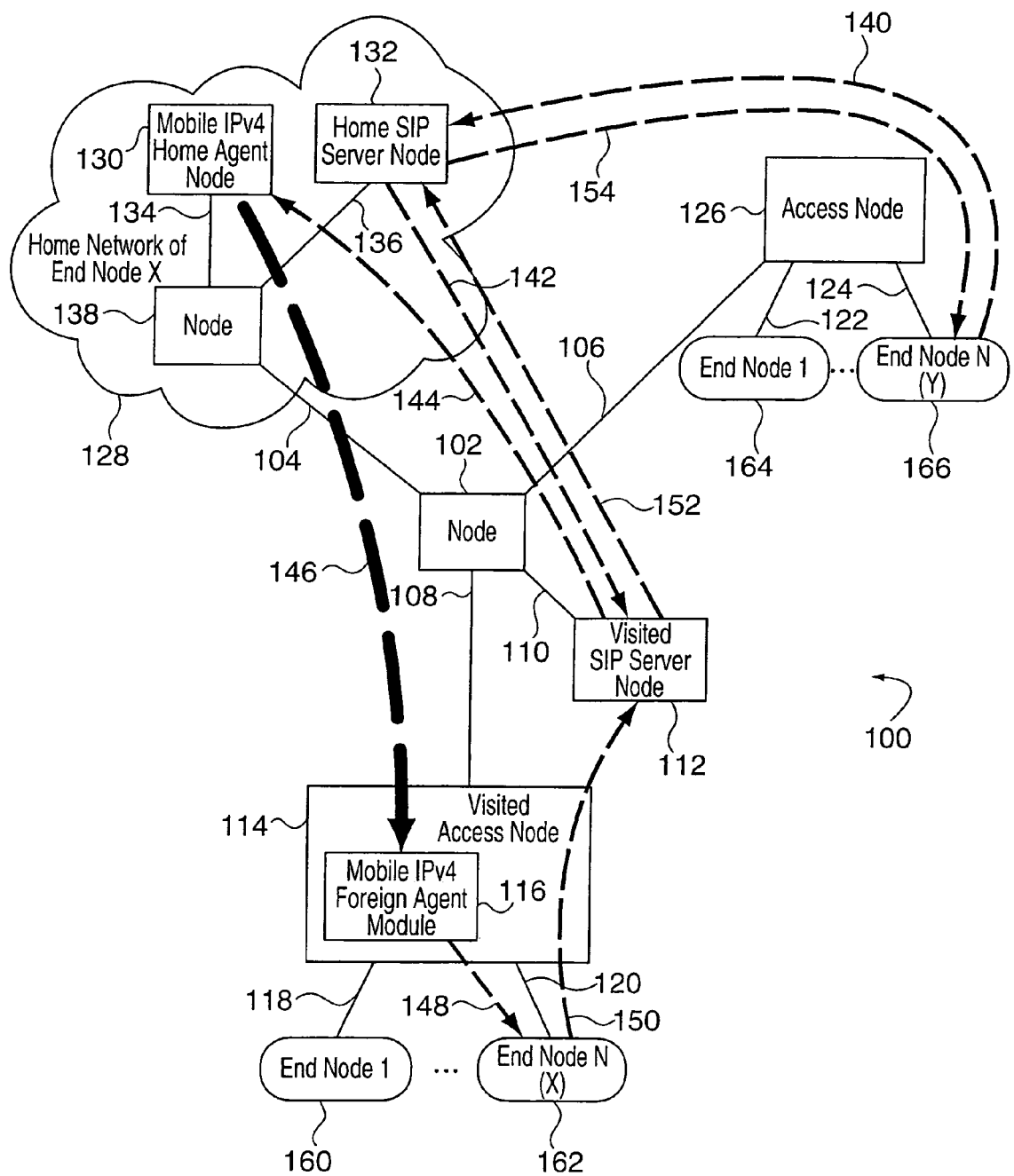
FIG. 1 illustrates one technique for using Session Initiation Protocol signaling in a mobile IP environment wherein a first mobile end node interacts with another end node via various other network elements.

Methods and apparatus of the present invention can be used to support session signaling and mobility management in a network including a plurality of end nodes that interact via one or more access nodes are described. The access nodes may be implemented as wireless access routers which include receiver and transmitter circuitry and an interface to support communications with end nodes, e.g., mobile nodes, via a wireless communications channel. The access nodes may be, for example, base stations in a cellular communications system. The interface in each access node may also include circuitry for coupling the access node to another node, e.g., an intermediate node used to couple two or more access nodes together.

A network implemented in accordance with the present invention includes one or more access nodes of the present invention through which end nodes can establish and conduct communications sessions. End nodes may be, for example, mobile devices which include or are IP hosts. An access node implemented in accordance with some embodiments of the present invention includes, a session signaling module in addition to a mobility agent module. In some but not all embodiments, the sessions signaling module is included in the same access node housing as the mobility agent module. Access nodes need not include a session signaling module in all cases. An authentication module, network resource information and state information are also included in the access node in some embodiments. The session signaling module may be, e.g., a Session Initiation Protocol (SIP) server while the mobility agent module may be implemented as a Mobile IP module. The various modules comprising an access node in accordance with the invention are implemented in a fashion that allows resource and state information from each module as well as the other parts of the access node to be visible, used and/or updated by one another.

Various features of the present invention facilitate session signaling address registration operations and are intended to reduce the number of session signaling registration messages that need to be transmitted as an end node registers while in a foreign domain, with home session signaling servers in one or more home domains associated with the end node. For purposes of explanation the end node will sometimes be called a mobile node. However, it is to be understood that the end node could also be a fixed node.

In accordance with one feature of the present invention, the home session signaling server stores information associating a session signaling address of an access node in the visited domain with a session signaling address of an end node, e.g., a mobile node, while the mobile node is using said access node in the visited domain as a point of network attachment. The home session signaling server routes session signaling packets addressed to the mobile node using the stored address information to the address of the access node in the visited domain. The access node then routes the received packets intended for the visiting mobile node to the mobile node, e.g., via a wireless link.

In some embodiments, the access node in the visited domain detects session signaling messages directed to a home session signaling server, intercepts said messages, and then transmits session signaling messages to the home session signaling server which include the session signaling address of the access node. The generation of the registration message transmitted from the access node to the home session signaling server may involve an address translation operation which involves replacing at least a portion of the mobile node's session signaling address, included in the intercepted registration message, with at least a portion of the access node's session signaling address.

In order to reduce the amount of communications resources used to transmit session signaling registration messages from mobile nodes to access nodes, in accordance with one feature of the present invention, broadcasting of session signaling messages is supported by access nodes. In one broadcast embodiment, when a session signaling registration message is received by an access node, the access node checks stored information to determine if multiple home session signaling servers are to be supplied with a session signaling message. In such an embodiment, a list of home session signaling server addresses is maintained and associated with mobile node addresses in the access node. The access node compares a mobile node session signaling address included in the received registration message to determine if the message should be transmitted to multiple home session signaling servers listed in the stored information, e.g., in associated with the mobile node's address. In response to determining that a received registration message is to be broadcast, the access node transmits the message, or a modified version of the received session signaling registration message, to the home session signaling servers indicated in the set of stored information.

In accordance with another session signaling registration message broadcast feature, a novel session signaling registration message is supported. The novel session signaling registration message includes multiple end node session signaling identifiers, e.g., addresses of different home session signaling servers. The multiple end node session signaling identifiers are in addition to a target field and a contact field. The novel registration message is transmitted from a mobile node to an access node. The access node receives and processes the registration message. In response to the registration message, the access node transmits a separate session signaling registration message to at least two, e.g., each, of the home session signaling servers identified by the multiple end node session signaling identifiers included in the received registration message. As part of the registration message signaling process, the novel session signaling registration message is stored in a machine-readable medium, e.g., a buffer, memory, or other storage device, included in the end node transmitting the message and also in the access node receiving the message.

Through the use of the above-described broadcast techniques, the amount of bandwidth used to transmit session signaling registration messages can be reduced as compared to systems which do not use such broadcast techniques.

In order to reduce the number of session signaling address registration messages transmitted between network domains, e.g., a visited domain and one or more home domains, in various embodiments a paging and location server is used in the visited domain. When in the visited domain, a visiting end node registers its session signaling address with the paging and location server in the visited domain. It also registers the session signaling address of the paging and location server in the visited domain with its home session signaling servers. The home session signaling server directs packets to the end node in the visiting domain to the paging and location server which then directs them to the access node in the visiting domain to which the visiting end node is coupled to at any given point in time. As the visiting end node moves from access node to access node in the visited domain, it updates its session signaling address information that has been stored at the paging and location server. However, it does not have to update the session signaling address information stored at its home session signaling server since that information remains valid since the paging and location server used by the visiting node remains unchanged. In this manner, the need to transmit session signaling registration messages to one or more home session signaling servers after a handoff in a visited domain is reduced or avoided.

The modules included in the access nodes, paging and location server and home session signaling servers of the invention are implemented using software, hardware or a combination of software and hardware. In the case of software implementations, the modules include different instructions or sets of instructions used to control hardware, e.g., circuitry, to implement each of the different operations performed by the module.

Numerous additional embodiments, features, and advantages of the methods and apparatus of the present invention are discussed in the detailed description that follows.

DETAILED DESCRIPTION

Figure 2:
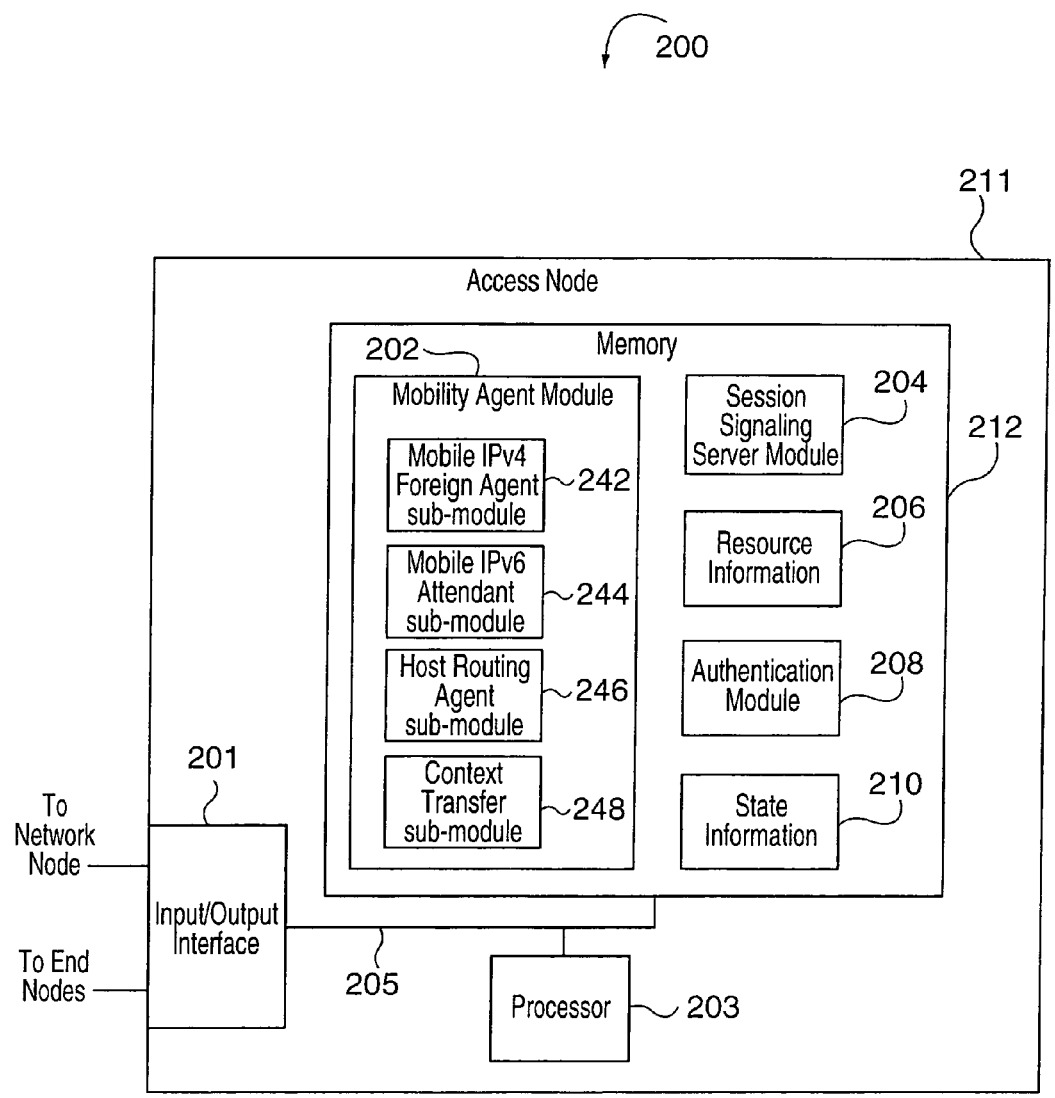
FIG. 2 illustrates an access node implemented in accordance with the present invention.

FIG. 2 illustrates an exemplary access node 200 implemented in accordance with the present invention. In the FIG. 2 embodiment, the access node 200 includes an input/output interface 201, a processor 203 and memory 212, coupled together by bus 205. The elements 201, 203, 212, 205 of access node 200 are located inside a housing 211, e.g., a case of plastic and/or metal, represented by the rectangle surrounding the node's internal elements 201, 203, 212, 205. Accordingly, via bus 205 the various components of the access node 200 can exchange information, signals and data. The input/output interface 201 provides a mechanism by which the internal components of the access node 200 can send and receive signals to/from external devices and network nodes. The input/output interface 201 includes, e.g., a receiver circuit and transmitter circuit used for coupling the node 200 to other network nodes, e.g., via fiber optic lines, and to end nodes, e.g., via wireless communications channels.

The processor 203 under control of various modules, e.g., routines, included in memory 212 controls operation of the access node 200 to perform various signaling, session admission, resource allocation, authentication, and other operations as will be discussed below. The modules included in memory 212 are executed on startup or as called by other modules. Modules may exchange data, information, and signals when executed. Modules may also share data and information when executed. In the FIG. 2 embodiment, the memory 212 of access node 200 of the present invention includes a mobility agent module 202, a session signaling server module 204 and an authentication module 208 as well as resource information 206 and state information 210.

Resource information 206 includes, e.g., parameters, resource limits both internal to the access node 200 as well as on its interfaces 201, indication and/or accounting of active sessions and/or used resources and/or available resources both internal to the access node 200 as well as on its interfaces 201. State information 210 includes, e.g., parameters, communication session and/or end node status information, security information, and/or other information relating to end node interaction and/or communication with an access node and/or another device.

The session signaling server module 204 allows the access node 200 to support session initiation operations, e.g., processing of received signals or messages used for the establishment of a data communication sessions and sending of subsequent signals or messaging as required. The session signaling server module 204 also supports session maintenance and termination services. During a session initiation operation as part of an admission control step the session signaling server may take into account and keep track of available resources. Thus, the session signaling server may access and update the resource information 206, which is kept in memory 212, e.g., information on available remaining bandwidth not allocated to active sessions.

The mobility agent module 202 allows the access node 200 to support end node mobility and connectivity management services. Thus, the access node 200 is capable of providing node mobility, session establishment, and session maintenance services to connected end nodes. The mobility agent module 202 may be implemented in a plurality of ways. In the FIG. 2 embodiment it is implemented with a collection of sub-modules. As illustrated, the mobility agent module 202 includes sub-modules 242, 244, 246, which operate as a Mobile IPv4 Foreign Agent, a Mobile IPv6 Attendant, and a Host Routing Agent, respectively. By including sub-modules 242, 244 the mobility agent module 202 is capable of supporting multiple versions of Mobile IP signaling including Mobile IPv4 and Mobile IPv6 signaling. In various embodiments, the mobility agent module 202 includes a subset of the sub-modules 242, 244 and 246 shown in FIG. 2. For example, in embodiments where Mobile IPv6 is not required, the mobile IPv6 Attendant sub-module 244 may be omitted.

As shown in FIG. 2, the exemplary mobility agent module 202 includes a context transfer sub-module 248 used to perform information, e.g., state, transfer operations as part of a handoff. As part of a handoff operation executed by the mobility agent module 202 when an end node changes its point of connection from the access node 200 to another access node, or vice versa, the context transfer sub-module 248 performs an operation to support the transfer of state information 210 regarding the end node from one access node to the next. The state information 210 that is transferred includes state information provided by other modules in memory 212. In particular, the state information 210 includes data communication session state and session establishment state provided by the session signaling server module 204, as well as authentication state and other security related state provided by the authentication module 208. In the present context "state" is used to broadly refer to information about a state, e.g., of a device, node, or communications session. In alternative embodiments of the invention the mobility agent module 202 may also include additional sub-modules to support a number of mobility related functions that improve the performance of handoff and minimize service disruption. In another alternative embodiment equivalent context transfer functionality may be implemented as a separate module in memory 212, as opposed to a sub-module of the mobility agent module 202.

The authentication module 208 included in memory 212 of the access node 200 is capable of authenticating messages and signals from other network nodes and end nodes connecting to the access node 200 via the input/output interface 201. The authentication module 208 also provides authentication services to other modules and sub-modules included in the memory 212 of the access node 200. Thus, the authentication module 208 can check the validity of messages and signals received by other modules and sub-modules in memory 212, e.g., the session signaling server module. 204. Authentication module functionality can be incorporated directly into other modules or sub-modules instead as a separate module 208.

Incorporating a session signaling server module 204, mobility agent module 202, and authentication module 208 inside the housing 211 of an access node 200 where resource information 206 and state information 210 can be easily accessed, provides significant advantages in terms of signaling complexity associated with session establishment and maintenance over the FIG. 1 system.

While shown as software module in the FIG. 2 implementation, each of the modules 204, 202, 208, and sub-modules included therein, can be implemented using hardware, software or a combination of software and hardware. For purposes of the invention described herein, references to modules or sub-modules are to be understood as software, hardware or a combination of software and hardware that performs the functions of the described module or sub-module.

In accordance with one particular embodiment of the present invention, the session signaling server module 204 is a SIP (Session Initiation Protocol) server. In a particular embodiment, the access node 200 is implemented as a wireless access router that supports forwarding of IP (Internet Protocol) datagrams. In such an implementation input/output interface 201 includes circuitry, e.g., receiver/transmitter circuitry, that allows end nodes to connect to the access node 200 using wireless communications technology, e.g., via wireless communications channels. In one such implementation the coverage area of the access node is called a communication "cell". In alternative embodiments, the session signaling server module 204 sends, receives and processes signal based on other protocols such as the Resource Reservation Protocol (RSVP). In some embodiments the session signaling server module 204 supports both SIP and RSVP signaling. In some embodiments the input/output interface 201 includes circuitry that allows end nodes to connect to it via wired, wireless or a combination of wired and wireless communications technologies.

Figure 3:
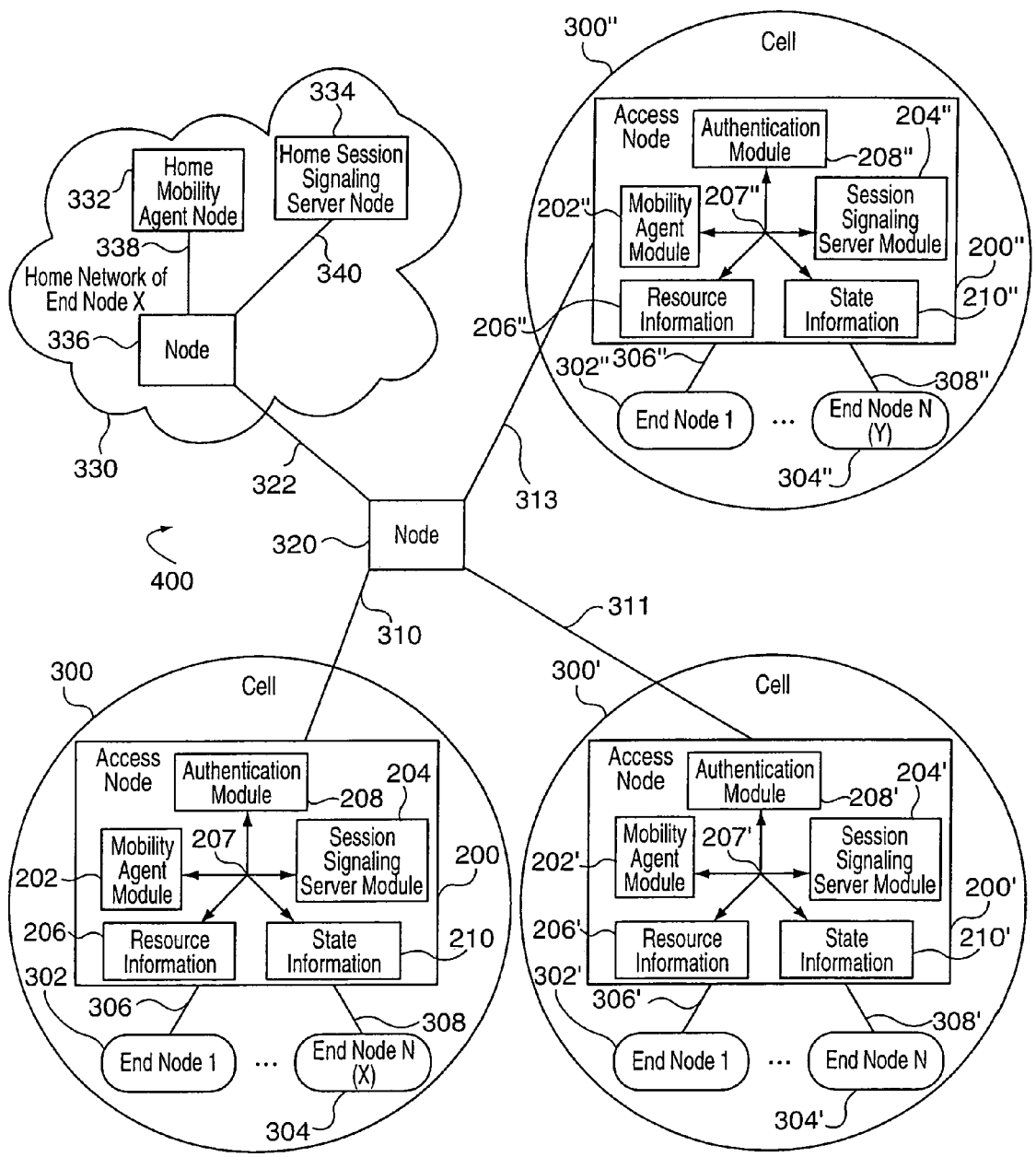
FIG. 3 illustrates a network diagram of a communications system implemented in accordance with an exemplary embodiment of the invention.

FIG. 3 illustrates an exemplary system 400 that comprises a plurality of access nodes 200, 200', 200" implemented in accordance with the present invention. FIG. 3 also depicts communication cells 300, 300', 300" surrounding each access node 200, 200', 200", respectively, which represents the coverage area of corresponding access node 200, 200', 200", respectively. The same physical and functional elements are depicted in each of the communication cells, thus the following description of the elements in the cell 300 surrounding access node 200 is directly applicable to each of the cells 300, 300', 300". The depiction of the access node 200 is a simplified representation of the access node 200 depicted in FIG. 2. The illustration of the access node 200 in FIG. 3 depicts the mobility agent module 202, session signaling server module 204, authentication module 208, resource information 206 and state information 210, while some other elements are not shown. A set of arrows 207 is used to represent the exchange of data, information, and signals between the depicted elements when they are executed. While the input/output interface 201 is not shown in FIG. 3, connectivity between access node 200 and other network nodes is shown and is subsequently further described. FIG. 3 illustrates the access node 200 providing connectivity to a plurality of N end nodes 302, 304 via corresponding access links 306, 308.

Interconnectivity between the access nodes 200, 200', 200" is provided through network links 310, 311, 313 and an intermediate network node 320. The intermediate network node 320 also provides interconnectivity to another network 330 via network link 322, where the network 330 is the home network of end node X 304. The home network 330 includes a home mobility agent node 332 and a home session signaling server node 334, each of which is connected to an intermediate network node 336 by one of two network links 338, 340, respectively. The intermediate network node 336 in the home network 330 also provides interconnectivity to network nodes that are external from the perspective of the home network 330 via network link 322.

The home mobility agent node 332 in the system 400 allows end node X 304 to maintain reachability as it moves between access nodes 200, 200', 200". The home mobility agent node 332 is responsible for redirecting packets to the current location of end node X 304 by maintaining a mapping between the home address and an address associated with the access node through which end node X 304 is current connected. The home session signaling server 334 in the system 400 provides session signaling and redirection services to facilitate establishment of data communication sessions to end node X 304.

Alternative embodiments of the invention include various network topologies, where the number and type of network nodes, the number and type of links, and the interconnectivity between nodes differs from that of the system 400 depicted in FIGS. 3 to 6.

Figure 4:
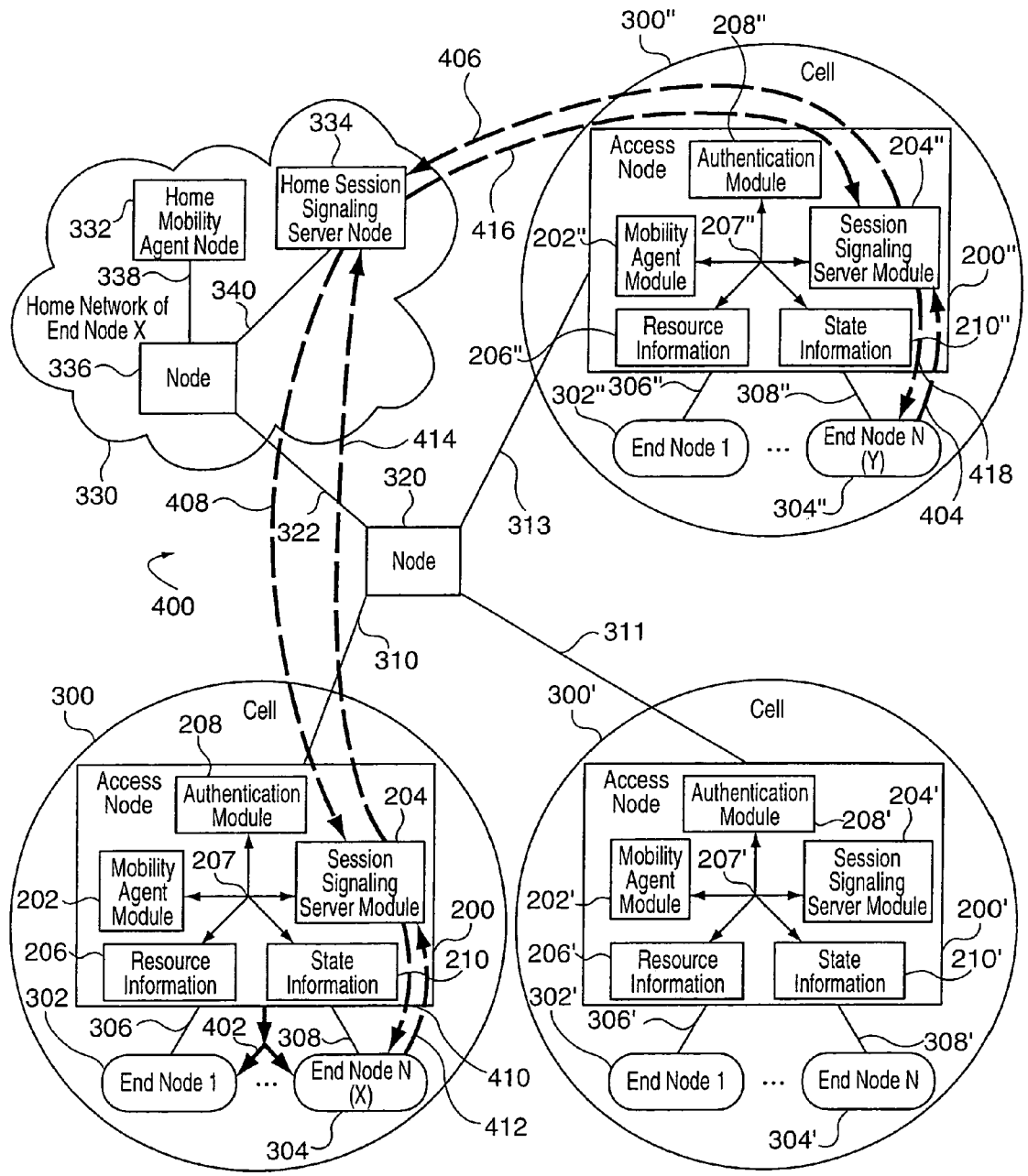
FIG. 4 illustrates signaling performed in the exemplary system shown in FIG. 3 as part of the processes of initiating and conducting a data communication session between a first mobile end node and another end node in accordance with an exemplary embodiment of the invention.

FIG. 4 illustrates the signaling performed in the exemplary system 400 shown in FIG. 3 as part of the processes of initiating and conducting a data communication session between a first mobile end node X 304 and second end node Y 304" in accordance with an exemplary embodiment of the invention. The following description of how end nodes 302, 304 obtain service through access node 200, including the methods for authentication and discovery of an identifier, e.g., address, is representative of similar operations that may be performed by end nodes (302, 304), (302', 304'), (302", 304") and the corresponding access node 200, 200', 200", respectively. In order to obtain service through the access node 200, end nodes 302, 304 perform various signaling and other operations when they enter the coverage area of an access node 200. The specific details of these signals and operations vary depending on the underlying communication technology and protocols used. In the FIG. 4 embodiment of this invention, an authentication module 208 in an access node 200 uses an end node specific secret value to authenticate signals, e.g., messages, received from an end node 302, 304 during an initial access phase and uses the same secret value to validate messages subsequently received by other modules, e.g., the session signaling server module 204. In addition to using the same secret value, the authentication module 208 may also use the same method to perform the authentication operation for messages received by the various modules.

In the FIG. 4 embodiment of this invention, the mobility agent module 202 and session signaling server module 204, each of which is included in the access node 200, can be contacted using the same identifier. The identifier may be, e.g., an IP address associated with both modules 202, 204. According to this invention the shared identifier, e.g., address, is made known to the end nodes 302, 304 within the coverage area of access node 200 by sending a signal, e.g., message 402 from the access node 200 to the end nodes 302, 304. Similarly, end nodes in the exemplary system 400 receive this identifier, e.g., address, information from their corresponding access node through which they access the communications system 400. In one particular embodiment of this invention an access node 200 periodically broadcasts a signal, e.g., message 402, including the identifier, e.g., address, information. In alternative embodiments an end node 302, 304 solicits the identifier, e.g., address, information by sending a signal, e.g., message, when it enters the coverage area of an access node 200. The access node 200 then responds by sending a signal, e.g., message, including the requested identifier, e.g., address, information to the end node. An access node 200 may also use a combination of the two methods, in which case access node 200 periodically broadcasts a signal, e.g., message, including the identifier, e.g., address, information and also responds to specific solicitations from end nodes 302, 304.

In the FIG. 4 illustration, end node Y 304" initiates establishment of a data communication session with end node X 304. End node Y 304" first sends a request session signaling message 404 to end node X 304 via the session signaling module 204" in the access node 200". While the request message 404 is directed to the session signaling module 204", the request message 404 also identifies end node X 304 as the target of session establishment request. The session signaling module 204" in access node 200" receives the request message 404, adds its own identifier, e.g., address, to the request message and redirects the request message 406 to the home session signaling server 334 of the end node X 304. The home session signaling server 334 receives the request message 406, adds its own identifier, e.g., address, to the request message and redirects the request message 408 to the currently registered location of end node X 304, which is the session signaling module 204 in access node 200 to which end node X 304 is connected.

Following reception of the request message 408 from the home session signaling server 334, the session signaling module 204 in access node 200 accesses state information 210 associated with the mobility agent 202 to control redirection of the request message. Since the state information 210 indicates that end node X 304 is directly connected via access link 308, the session signaling server module 204 does not have to direct the request message to the home mobility agent 332 of end node X 304. Instead it adds its own identifier, e.g., address, to the request message 408 and delivers the request message 410 directly to end node X 304 over access link 308.

Following reception of the request session signaling message 410, end node X 304 sends a response session signaling message 412 back to end node Y 304". The response message 412 from end node X 304 to end node Y 304" takes the reverse path specified by the list of identifiers, e.g., addresses, of intermediate session signaling nodes included in the received request message. In particular, the response message 412 is sent from end node X 304 to the session signaling module 204. Session signaling server module 204 sends the response message 414 to home session signaling server node 334, which sends the response message 416 to session signaling server module 204" in access node 200". The session signaling server module 204" in access node 200" then sends the message 418 to end node Y 304", which completes the session signaling transaction.

According to this invention since the session signaling server modules 204, 204" in the access nodes 200, 200", respectively, are in the session signaling path, they have access to the information in the session signaling message that describe the session's resource requirements. Resources such as a minimum bandwidth on the access link may be required for sessions to operate appropriately. Additionally, the session signaling modules 204, 204" have access to the current access node load levels and local policy contained in resource information 206, 206" and state information 210, 210". Based on this information the session signaling servers 204, 204" in the access nodes 200, 200" can admit or reject the session that end node X and end node Y attempt to establish. If a session is admitted, the session signaling server modules 204, 204" reserve these resources in the access nodes 200, 200".

Figure 5:
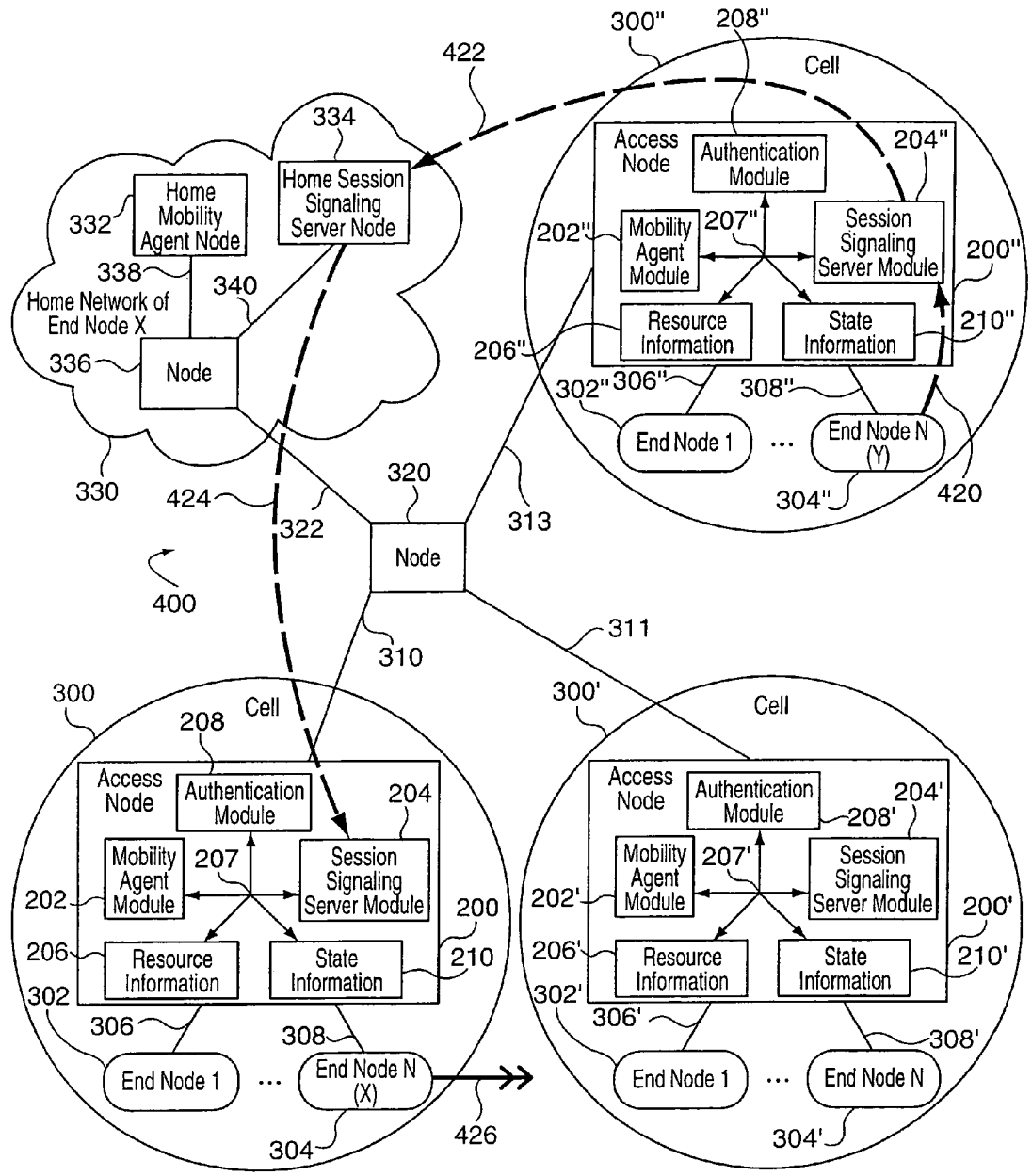
FIGS. 5 and 6 illustrate signaling performed in the exemplary system shown in FIG. 3 as part of the process of initiating and conducting a data communication session between a first mobile end node and another end node in accordance with an exemplary embodiment of the invention, while the first mobile end node is in the process of a handoff between two access nodes.
Figure 6:
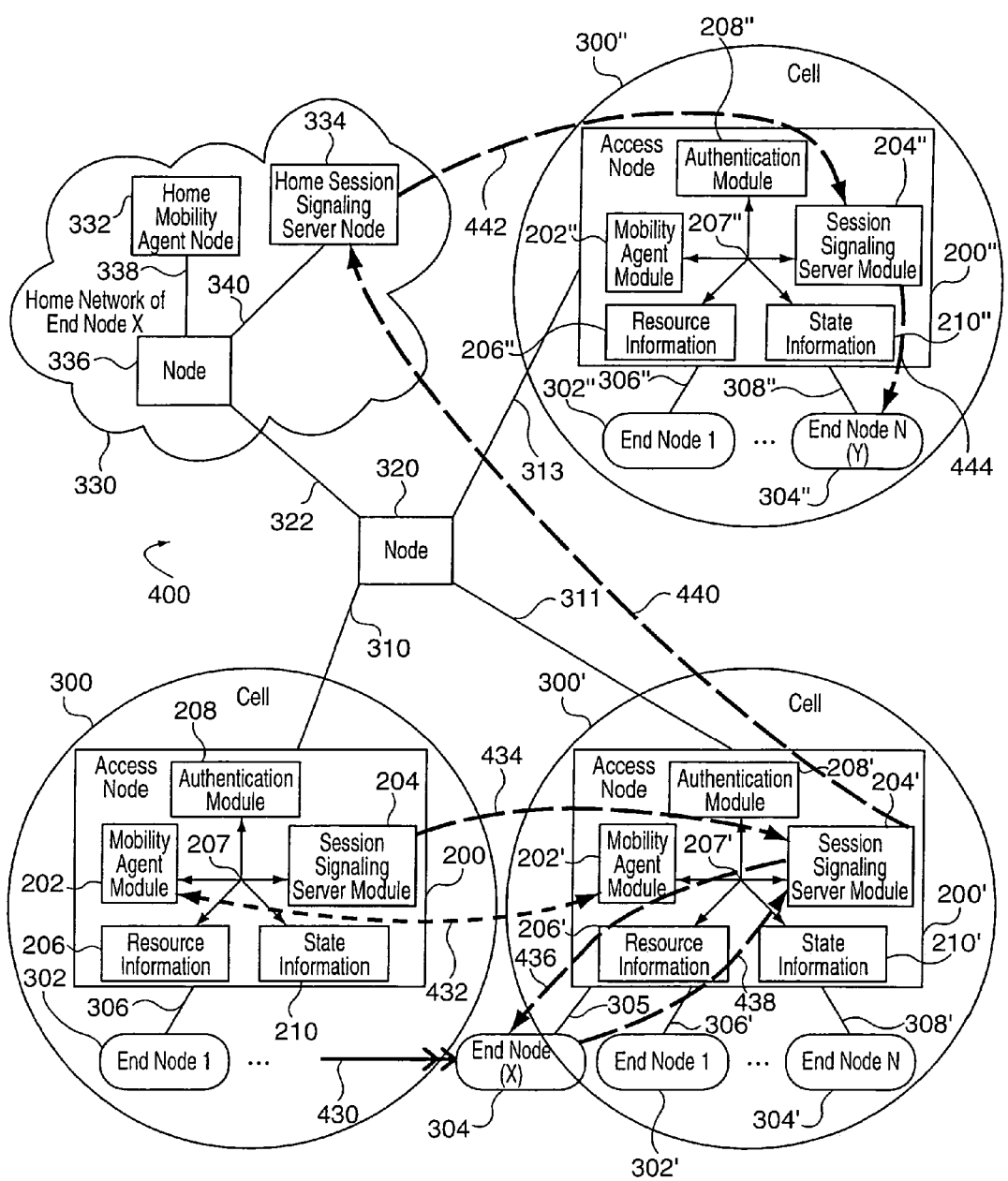

In the exemplary embodiment of this invention end node X 304 is mobile and thus can at any time move between the communication cells 300, 300', 300". FIGS. 5 and 6 illustrate signaling performed in the exemplary system 400 shown in FIG. 3 as part of the processes of initiating and conducting a data communication session between a first mobile end node X 304 and second end node Y 304" in accordance with an exemplary embodiment of the invention, while the target end node X 304 is in the process of handing off between a first access node 200 and a second access node 200'. The movement of end node X 304 in FIGS. 5 and 6 is depicted with a double arrow 426, 430 in each figure, respectively. For illustration purposes FIGS. 5 and 6 depict the signaling and interaction between nodes according to an exemplary timing of events described below. Similar but not necessarily identical processes will apply if the timing of the events is modified.

As shown in FIG. 5, end node Y 304" first sends a request session signaling message 420 to end node X 304 via the session signaling module 204" in the access node 200". While the request message 420 is directed to the session signaling module 204", the request message 420 also identifies end node X 304 as the target of session establishment request. The session signaling module 204" in access node 200" receives the request message 420, adds its own identifier, e.g., address, to the request message and redirects the request message 422 to the home session signaling server 334 of the end node X 304. The home session signaling server 334 receives the request message 422, adds its own identifier, e.g., address, to the request message and redirects the request message 424 to the currently registered location of end node X 304, which is the session signaling module 204 in access node 200 to which end node X 304 is connected.

Prior to the arrival of request message 424 at the session signaling server module 204, end node X 304 changes its point attachment to the network from a first access node 200 to a second access node 200'. Note that FIG. 5 shows end node X 304 connected to the first access node 200 via access link 308, while FIG. 6 shows end node X 304 connected to the second access node 200' via access link 305. FIG. 6 illustrates a handoff operation 432 that is coordinated by the mobility agent modules 202, 202' in access nodes 200 and 200'. As part of the handoff operation 432, state information 210 associated with end node X 304 is transferred from the first access node 200 to the second 200'. Transferred information includes, for example, authentication information, shared secrets, and unique identifiers for previously admitted sessions as well as any associated session state for end node X 304 in access node 200. During and for a predetermined period of time following the handoff operation 432, the mobility agent module 202 in the first access node 200 maintains state information 210 regarding the new point of attachment of end node X 304, e.g., an identifier or address of the second access node 200'. Thus, upon arrival of request message 424 from the home session signaling server 334, the session signaling module 204 in access node 200, accesses the state information 210 associated with the mobility agent 202 to control redirection of the request message. Since the state information 210 in the first access node 200 indicates that end node X 304 has changed its point of attachment to the second access node 200', the session signaling server module 204 in the first access node 200 optionally add its own identifier, e.g., address, to the request message and immediately redirects the request message 434 to the session signaling server module 204' in the second access node 200', as shown in FIG. 6. Note that in the exemplary embodiment, the session signaling server module 204 in the first access node 200 does not add its own identifier, e.g., address, to the request message 434 that is directed to the session signaling server module 204' in the second access node 200'.

Following reception of the request message 434 from the session signaling server module 204 in the first access node 200, the session signaling module 204' in the second access node 200' accesses state information 210' associated with the mobility agent 202' to control redirection of the request message. Since the state information 210' indicates that end node X 304 is directly connected via access link 305, the session signaling server module 204' does not have to direct the request message to the home mobility agent 332 of end node X 304. Instead, it adds its own identifier, e.g., address, to the request message 434 and then delivers the request message 436 directly to end node X 304 over access link 305.

Following reception of the request session signaling message 436, end node X 304 sends a response session signaling message 438 back to end node Y 304", as shown in FIG. 6. The response message 438 from end node X 304 to end node Y 304" takes the reverse path specified by the list of identifiers, e.g., addresses, of intermediate session signaling nodes included in the received request message. In particular, the response message 438 is sent from end node X 304 to the session signaling module 204'. Session signaling server module 204' sends the response message 440 to home session signaling server node 334, which sends the message 442 to session signaling server module 204" in access node 200". The session signaling server module 204" in access node 200" then sends the message 444 to end node Y 304", which completes the session signaling transaction. Recall that in the exemplary embodiment, the session signaling server module 204 in the first access node 200 did not add its own identifier, e.g., address, to the request message 434 that was directed to the session signaling server module 204' in the second access node 200' and therefore is not included in the reverse path.

While session signaling between end node Y 304" and end node X 304 is described to go via the session signaling server modules 204" and 204 in access nodes 200" and 200 and only one additional session signaling server node 334 in the network, in several embodiments of this invention the request/response messages may go through a number of other session signaling nodes in the network according to network policy and message routing.

While in the description above the session signaling server modules 204, 204" reserve the resources required directly in an alternative embodiment of this invention, end nodes 304, 304" and/or session signaling servers 204, 204" may use resource reservation protocol messages, such as RSVP messages, to reserve the resources for an admitted session. In one embodiment of the invention and during the admission phase for a given session the access node 200 generates a unique identifier and associates it with the admitted session. This identifier is unique in this access node 200 and also in any other access nodes 200' 200" to which the end node X 304 may move to during the lifetime of the session. In one particular embodiment the access node 200 ensures uniqueness of the identifier by combining a value associated with end node X 304 and another value associated with access node 200. Similarly a unique identifier is generated by access node 200" for the same session to which end node Y 304" participates.

While session request signals from the end nodes, such as signal 404 in FIG. 4 are shown as being explicitly sent directly to the session signaling server module, e.g.: 204" in FIG. 4, in another alternative embodiment of this invention the request session signaling message 404 from end node Y 200" is not directed to the session signaling module 204" in the immediate access node 200", but is instead sent to another session signaling node in the network, e.g., the home session signaling server 334 of end node X 304. In such a case the session signaling module 204" in access node 200" would intercept, e.g., snoop, the message 404 and inspect the message 404 to extract the information required so that the session can be admitted or rejected. In such an implementation, we refer to the session signaling server module 204" as a snooping session signaling module. In an alternative embodiment of this invention the snooping session signaling module also adds its identifier, e.g., address, to the message before it send the message to the next session signaling node. Responding messages will thus explicitly go through the snooping session signaling module. The same procedure is repeated at the receiving end when the request session signaling message is not directed to the session signaling module 204 in access node 200. The session signaling module 204 instead intercepts the session signaling message 408, extracts the information needed for session admission and optionally adds its own identifier, e.g., address, to the message so that response session signaling messages will go through it in an explicit manner.

Additional aspects, features, methods, apparatus and exemplary embodiments which are part of the inventive methods and apparatus to which the present patent application is directed are described in the following U.S. Provisional patent applications each of which is hereby expressly incorporated by reference into the present patent application.

1. U.S. Provisional Patent Application Ser. No. 60/298,283, filed on Jun. 14, 2001, titled: "Location of SIP Proxy Server in Wireless Access Router".
2. U.S. Provisional Patent Application Ser. No. 60/369,016, filed on Apr. 1, 2002, titled: "Methods and Apparatus for Registration for SIP Services in Mobile Networks".
3. U.S. Provisional Patent Application Ser. No. 60/370,524, filed on Apr. 5, 2002, titled: "Methods and Apparatus for SIP Message Forwarding and Redirection".
4. U.S. Provisional Patent Application Ser. No. 60/313,035, filed on Aug. 16, 2001, titled: "A Method for Controlling IP Applications During Network Changes that Result in Resource Shortages".

As a result of the above incorporation by reference, the text and figures of the listed provisional patent applications form part of the present description. It is to be understood that the reference numerals used in the text and figures of the provisional patent applications are to be interpreted in the context of the particular incorporated provisional application and are not to be interpreted as the same as any similarly numbered element or elements described in the above text or the figures which are included herein without the use of an incorporation by reference. It is to be further understood that mandatory language in the incorporated provisional applications such as "must", "only", etc., if any, is to be interpreted as being limited to the exemplary embodiments described in the provisional applications and is not to be interpreted as a limitation on the embodiments, figures, and claims of the present application which are not incorporated by reference.

In the descriptions bellow we differentiate between the network address of a node and the session signaling address of the same node or its user. A network address is the address used to send a data packet via the routing network infrastructure to the owner node of that address. A session signaling address is used to send a signaling message to destination which typically involves the resolution of the session signaling address to a network address and the transmission of packet or packets to that network address. A Session signaling address typically has a "user" part and a "domain" part. The Network Access Identifier (NAI) and the Session Signaling Protocol Universal Resource Identifier (SIP-URI) are some examples of such an address. The typical format of said address is user@domain. The "domain" part identifies the operator's network or domain the user belongs to e.g.: Flarion.com. The domain part can typically be resolved to an actual network address such as an Internet Protocol (IP) Address via a database system e.g.: the Domain Name System (DNS). The "user" part identifies the user in the said domain e.g.: JohnSmith. The resultant address is JohnSmith@Flarion.com. To initiate session signaling communications with JohnSmith@Flarion.com one needs to send a session signaling message to JohnSmith@Flarion.com. This is achieved by resolving the domain part "Flarion.com" to the network address of the session signaling server for said domain and sending the message to that server. The Session Signaling Server then forwards the message to the current location of JohnSmith. If JohnSmith is in the same domain then his forwarding address may be something like JohnSmith@10.0.0.1 where 10.0.0.1 is an example of a network address that JohnSmith may be currently located. If JohnSmith is currently at a different domain e.g.: foreign.com then his forwarding address may become a concatenation of his session signaling address and the domain address of the visiting domain. E.g.: JohnSmith%Flarion.com@foreign.com.

An Operator's Domain or Network is a set of communication equipment (including routers, switches, cables, servers and other) under the ownership and administration of an Operator. An Operator may have multiple domains but a single domain is owned by a single operator.

Figure 7:
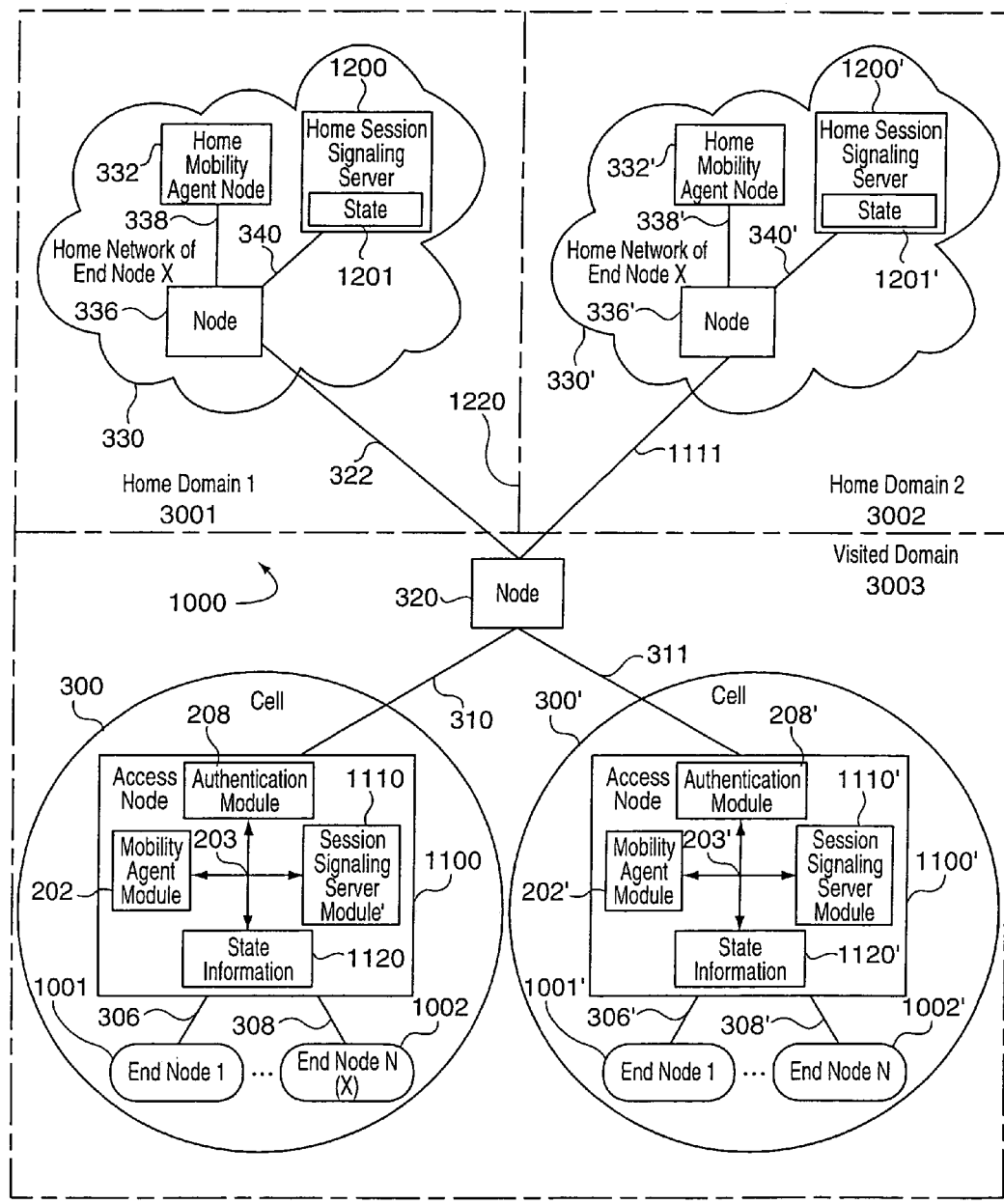
FIG. 7 illustrates a multi-domain network diagram of a communications system implemented in accordance with an exemplary embodiment of the invention.

FIG. 7 illustrates a multi-domain network diagram of a communications system 1000 implemented in accordance with an exemplary embodiment of the invention. Various messaging features of the system 1000 will be described in detail with reference to FIGS. 9 and 10 that show signaling performed in the system 1000 in accordance with various exemplary embodiments of the invention. The system 1000 is similar to the exemplary system 400 of FIG. 3 and may be implemented using many of the elements previously described with regard to FIG. 3. Like numbered elements in FIGS. 3 and 7 may be implemented using the same or similar elements. For the purposes of brevity, such elements will not be described in detail again.

Differences between FIG. 3 and FIG. 7 will now be described. Cell 300'' of FIG. 3 is replaced by a second home network 330'' in FIG. 7. The second home network 330'' is connected to the rest of the network via node 320 which is coupled to the second home network 330' by link 1111. Exemplary system 1000 spans three different domains: a home domain 1 3001, a home domain 2 3002, and a visited domain 3003. Home domain 1 3001 is separated from home domain 2 3002 by line 1220. Home domain 1 3001 and home domain 2 3002 are both separated from the visited domain 3003 by line 1210. Home network 330 is located in home domain 1 3001. Home network 330' is located in home domain 2 3002, while the rest of the exemplary system 1000 is shown to be located in the visited domain 3003. Home session signaling servers 1200 and 1200', of home networks 330 and 330' respectively, of FIG. 7 are similar to and replace the home session signaling server 334 of home network 330 in FIG. 3. States 1201, 1201' incorporated in home session signaling servers 1200 and 1200' of FIG. 7 are emphasized in the figure since the states 1201,1201' are to be manipulated, e.g., modified and updated, in accordance with various features of the present invention. States 1201, 1201' are sets of stored information which include information on various mobile nodes and the communication state of each mobile node. The state information 1201, 1201' includes information used for routing IP packets and for signaling purposes as will be discussed further below. Access nodes 1100, 1100' located within cells 300 and 300' within the visited domain 3003 of FIG. 7 may be implemented using the same or similar hardware as used to implement access nodes 200, 200' as shown in FIG. 3, but the operation of access nodes 1100 and 1100' has been extended by the addition of control routines and/or modules used to control the access node to operate in accordance with the methods described below with reference to FIGS. 9 and 10. Session signaling server modules 1110, 1110' of access nodes 1100, 1100' respectively of FIG. 7 are similar to session signaling server modules 200 and 200' shown in FIG. 3. State information 1120, 1120' of access nodes 1100, 1100' respectively, of FIG. 7 are similar to state information 210 and 210' as shown in FIG. 3. End nodes 1001, 1002, of cell 300 and end nodes 1001', 1002' of cell 300' shown in FIG. 7 are also identical or similar with corresponding end nodes 302, 304 and 302', 304' respectively as shown in FIG. 3. Session signaling server modules 1110, 1110', state information 1110, 1110', and end nodes 1001, 1002, 1001', 1002' have been equipped, e.g., include routines, which cause one or more of these elements to operate in the manner described below with regard to FIGS. 9-10.

Figure 8:
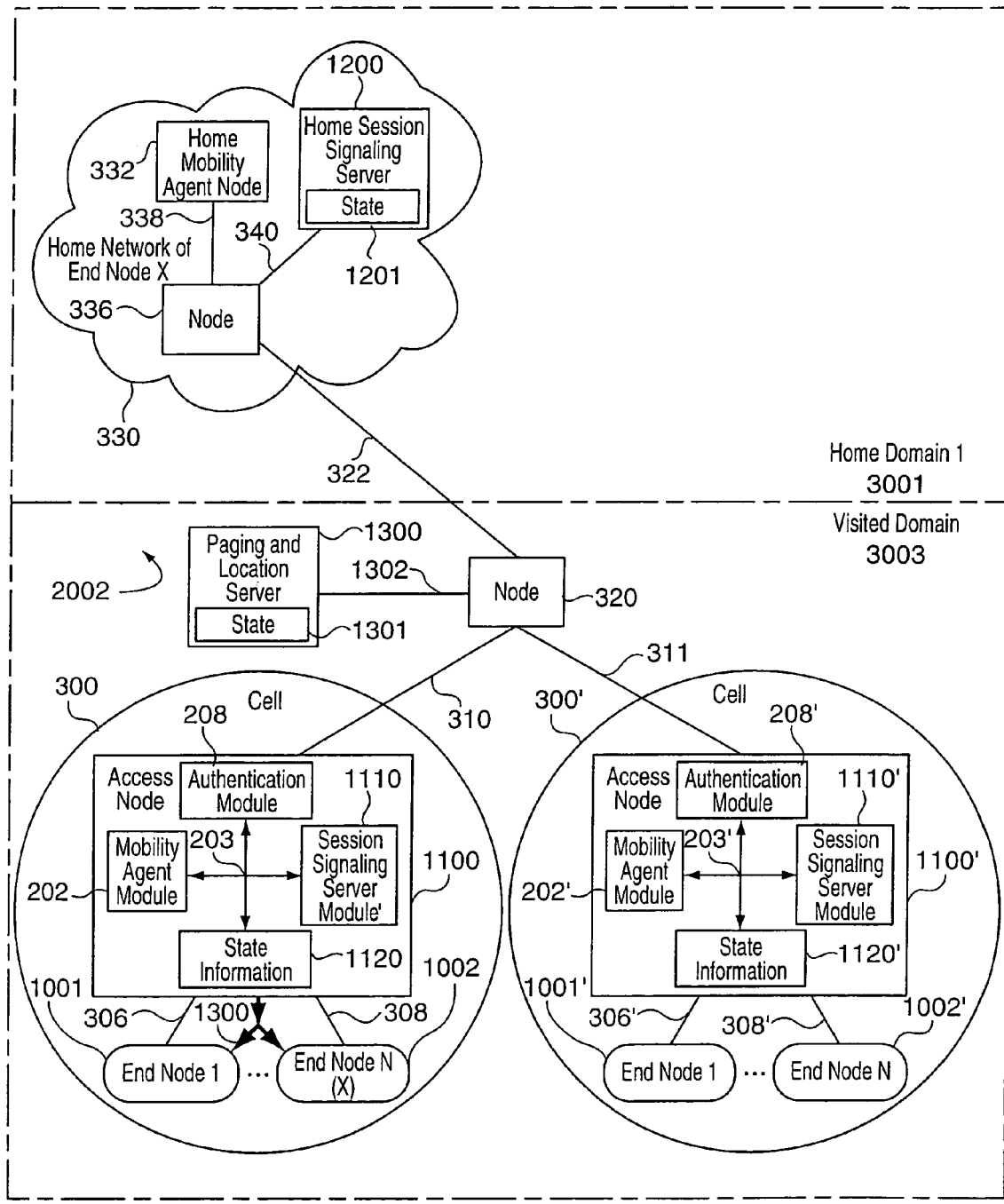
FIG. 8 illustrates a network diagram of a communications system implemented in accordance with an exemplary embodiment of the invention that includes a Paging and Location Server.

FIG. 8 illustrates an exemplary system 2002 that is similar to the exemplary system 1000 of FIG. 7 but which has been enhanced by the addition of a Paging and Location Server (PLS) 1300 in accordance with on embodiment of the invention. The PLS 1300, in accordance with the present invention servers as a repository of location registration information for a mobile node in a visited domain. As such, it can serve as an intermediary which can send messages used to update the state information in the visiting node's home session signaling server. Once the home session signal server 1200 is made aware of the PLS 1300 being used by a mobile node in a visited domain, it can contact the mobile through the PLS 1300 in the visited domain. As will be discussed further below, as the mobile moves from one access node to another access node while remaining in the visited domain, the PLS server 1300 in the visited domain is updated to reflect the change in location but the location information in the home session signaling server need not be updated since the PLS 1300 servicing the mobile node in the visited domain remains unchanged.

Like numbered elements in FIGS. 7 and 8 may be implemented using the same or similar elements. Since the like numbered elements have already been described in detail with regard to FIG. 7 and/or one of the preceding figures, for purposes of brevity, those elements will not be described in detail again. The differences between FIG. 7 and FIG. 8 are described below. The second home network 330' of FIG. 7 connected to the rest of the network via link 1111 has been removed in the exemplary system 2002 to simplify the figure but may be used in actual implementations. Exemplary system 2002 also spans two different domains, home domain 1 3001 and the visited domain 3003, which are separated by line 1210. Home network 330 is located in the home domain 1 3001, while the rest of the exemplary system 2002 is shown to be located in a visited domain 3003. Paging and location server (PLS) 1300 includes a processor, input/output interface and memory. The memory includes routines which control the PLS 1300 to store state information 1301 in its memory and receive and transmit messages including registration messages, in accordance with the present invention. The PLS 1300 is located in the visited domain 3003 and is connected to the network via node 320 which is connected to the PLS by link 1302. As will be discussed below with regard to FIGS. 12 and 13, PLS 1300 performs, depending on the embodiment, a wide variety of operations associated with communicating mobile node location information to one or more session signaling servers include, e.g., a visiting mobile node's home session signaling server 1200 located in the home domain 3001.

The network topology shown in FIGS. 7 and 8 are exemplary and intended for purposes of explaining the invention. The methods and apparatus of the present invention include can be used with a wide range of network topologies, where the number of domains, the number and type of network nodes, the number and type of links, the number and type of cells, the number and type servers, the interconnectivity between nodes, and the interconnectivity between servers and nodes, differs from that of the exemplary systems 1000, 2002 depicted in FIGS. 7 and 8.

For the purpose of illustration we give exemplary network and session signaling addresses in the different elements used in FIGS. 7 to 13.

Session Signaling Addresses
Home Session Signaling Server 1200: Home1.com
Home Session Signaling Server 1200': Home2.com
Paging and Location Server 1300: PLS.com Network Addresses
Access Node 1100: 20.0.0.1
Access Node 1100':20.0.1.1
End Node X 1002: 10.0.0.1

Figure 9:
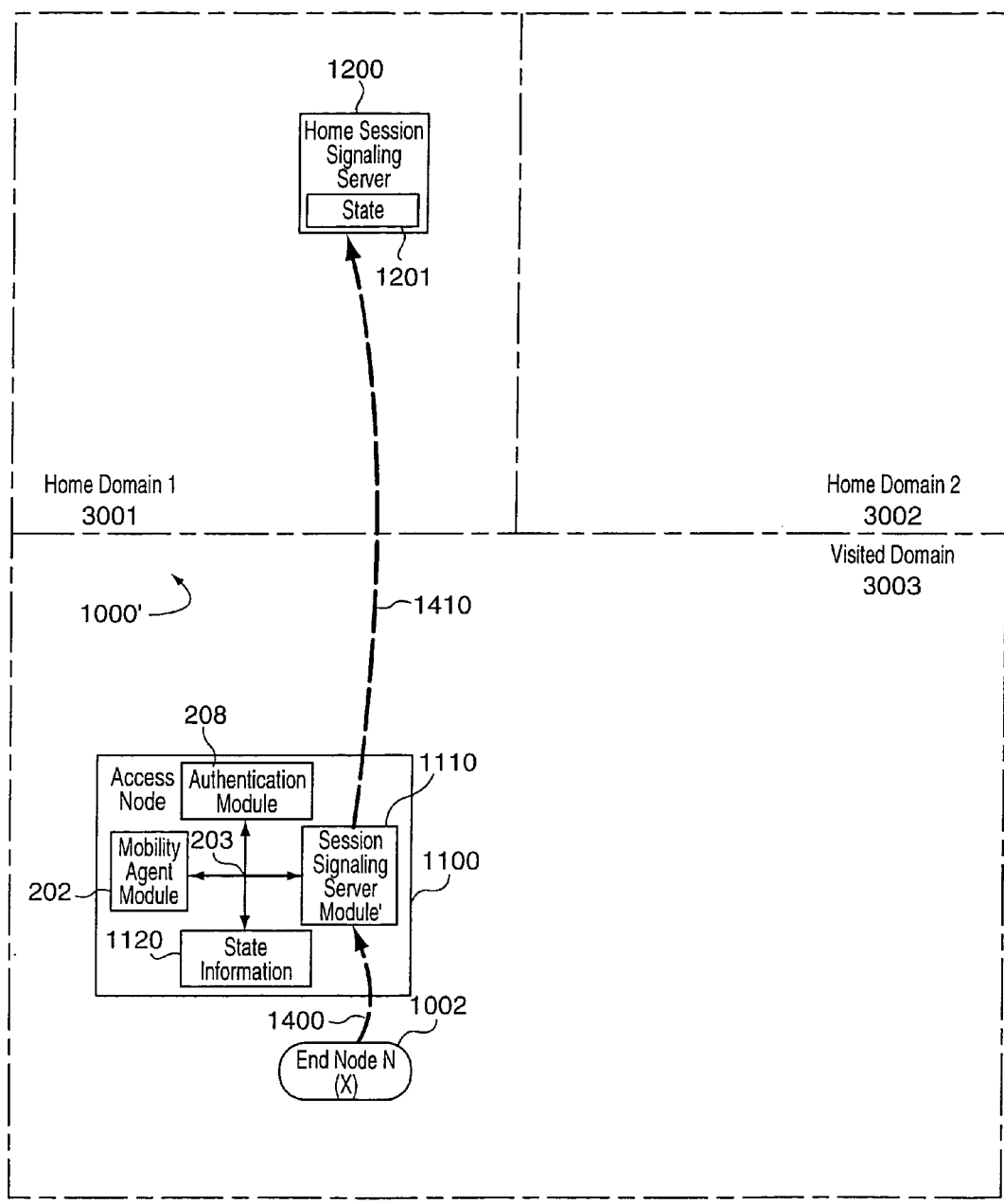
FIGS. 9 is a simplified version of the exemplary system shown in FIG. 7 that illustrates signaling performed for the purpose of end node registration to a home session signaling server via an access node.

FIG. 9 illustrates a simplified version of the exemplary system 1000 of FIG. 7 and depicts session signaling performed as part of the processes of registering the forwarding address of end node X 1002 to its home session signaling server 1200 via access node 1100 in accordance with one embodiment of the present invention.

In accordance with a first signaling method of the present invention, the mobile node, e.g., end node X 1002 is not aware of the presence of session signaling server module 110 in the access node 1100 through which it connects to is home domain 3001. The signaling associated with such an embodiment is shown in FIG. 9.

In the FIG. 9 embodiment, in order to register its location with its Home session signaling server 1200, end node X 1002 sends a REGISTER message 1400 directed to the network address of the home session signaling server node 1200. Since the access node serves as the mobile node's point of network attachment, this message is routed through access node 1100 where it is processed.

In accordance with the present invention, Session Signal Server module 1110 monitors for message to home session signaling server 1200 and, in response to detecting such a message intercepts and processes the message. In particular the Session Signaling Server module 1110 processes the received message to generate one or more new Register messages there from. The module 1110 also stores relevant address information in its set of State information 1120. In accordance with the embodiment shown in FIG. 9, the session signaling server module 1110 generates and transmits a new register message 1410 to the mobile node's home session signaling server 1200. As will be discussed further below, the processing performed by the session signaling server module may include message modification operations including address translation operations associated with generating the message 1410. It may also involve a broadcast operation as will be discussed with reference to FIG. 10.

The REGISTER message 1400 includes three main fields, a target field, a record field, and a contact field. The target field includes the address of the device to which the REGISTER message is directed, e.g., the address of home session signaling server node 1200. The record part of the message1400 includes the home session signaling address of the register message source, e.g., End Node X. The contact field of the Register message 1400 includes the forwarding address to be used for routing message to End Node X when outside the home domain 3001 in which the end node's home session signaling server 1200 is located.

In one embodiment, the session signaling server module 1110 modifies the received message 1400 by performing a translation operation to the contact field of the received message 1400 changing its value to a value that includes the access node's 1100 network address. In one particular embodiment, the contact field is translated to become a session signaling address that is the result of amending the access node's 1100 network address to the session signaling address of end node X 1002.

The first row of Table 1, set forth below, illustrates the exemplary contents of the three fields of an exemplary Register message 1400. The first row of table 1 correspond to message 1400 which is transmitted from a Mobile Node, e.g., exemplary mobile node X in the case of the FIG. 14 example, addressed to the mobile nodes Home Session Signaling Server. 1200. While the first column identifies the message listed in the particular row of Table 1, the second, third and fourth columns of each row are used to show exemplary contents of the messages Target, Record and Contact fields, respectively. The target field corresponding to message 1400 shown in Table 1, includes the session signaling address of End node X's home session signaling server node 1200. The home session signaling address of end node x 1002 is included in the message's record field. Meanwhile, the end node X's own network address is part of the node's session signaling address which is included in the contact field of exemplary message 1400.

The second row of Table 1 shows the three fields of an exemplary Register message 1410, generated by processing the register message shown in the first row.

effectively intercepts 1400 and sends message 1410 in its place. This Register message substitution operation is transparent to Mobile node X which sent the original Register message 1400 directed to its home session signaling server 1200.

In response to receiving Register message 1410, home session signaling server 1200 checks the record field of message 1410 and searches its state information 1201 for a matching record. The matching operation is performed based on, e.g., all or a portion of the address included in the Register message's register field which identifies the device attempting to register its location information. If a matching record is found, the record is updated with the new forward-

TABLE 1

| REGISTER MESSAGE | MESSAGE CONTENT | | |
|---|---|---|---|
| | Target | Record | Contact |
| Message 1400 from Mobile Node (MN) (e.g.End Node X (Enx)) addressd to Home Session Signaling Server Node (HSSSN) | Home Session Signaling Server Address<br>User = NULL<br>Domain = domain of HSSSN<br>Example: Home1.com | Home Session Signaling Address of End Node X (ENx)<br>User = user of ENx<br>Domain = domain of HSSSN<br>Example: ENx@Home1.com | Forwarding Session Signaling Address of ENx with domain part equal to network address of ENx<br>User = user of ENx<br>Domain = Network Address of ENx<br>Example: ENx@10.0.0.1 |
| Access Node (AN) Intercepts, Modifies Contact field and forwards message 1410 addressed to HSSSN | Home Session Signaling Server Address<br>User = NULL<br><br>Domain = domain of HSSSN<br>Example: Home1.com | Home Session Signaling Address of ENx<br>User = user of ENx<br><br>Domain = domain of HSSSN<br>Example: Home1.com | Forwarding Session Signaling Address of ENx<br>User = Home Session Signaling address of ENx (User = user of ENx, Domain = domain of HSSSN)<br>Domain = Network Address of access node 1100<br>Example: ENx%Home1.com@20.0.0.1 |

Access node 1100 add and maintains the session signaling address of the end node X 1002 obtained from the received Register message 1400 in state information 1120 for use in future routing operations. Access node 1100 forwards the generated message 1410 to the network address of the home session signaling server 1200 without forwarding the received register message 1400. Thus, access node 1100 ing information included in the contact field of the message. In one embodiment of the present invention, if a matching record is not found, a new record is created. Resultant state information in 1201 and 1120 generated and stored in the access node and the home session signaling server, respectively, based on the exemplary messages shown in Table 1 is illustrated in Table 2 which is set forth below.

TABLE 2

| | STATE INFORMATION | | |
|---|---|---|---|
| | Element | Record | Forward Address |
| | Home Session Signaling Server State 1201 | User = user of ENx<br><br>Domain = domain of HSSSN<br>Example: ENx@Home1.com | User = Home Session Signaling address of ENx (User = user of ENx, Domain = domain of HSSSN)<br>Domain = Network Address of access node 1100<br>Example: ENx%Home1.com@20.0.0.1 |
| | Access Node State Information | User = Home Session Signaling address of ENx (User = user of ENx, | Network address of directly connected ENx |

TABLE 2-continued

| | STATE INFORMATION | |
|---|---|---|
| Element | Record | Forward Address |
| 1120 | Domain = domain of HSSSN)<br>Domain = Network Address of access node 1100<br>Example:<br>ENx%Home1.com@20.0.0.1 | Example:<br>10.0.0.1 |

In an alternative embodiment of the present invention, which also results in the transmission of two register messages 1400, 1410 as shown in FIG. 9, End Node X 1002 is aware of the session signaling server module 1110 in access node 1100. End node X 1002 sends a REGISTER message 1400 directly to the network address of the access node 1100. In such an embodiment, register message 1400 will include the address of the access node in the Target field of the message and not the address of the home session signaling server. Table 3 shows the Register message 1400 which will be generated in such an embodiment in the first row of the table and the Register message 1410 which will be generated by the access node 1100 in the second row.

the second row to Table 3. It is this message which is transmitted to the home session signaling server 1200. The home session signaling server 1200 will processes the received message in the same manner as previously discussed with regard to the Table 2 example. The resultant state in 1201 and 1120 in this example will be identical to that of Table 2.

Figure 10:
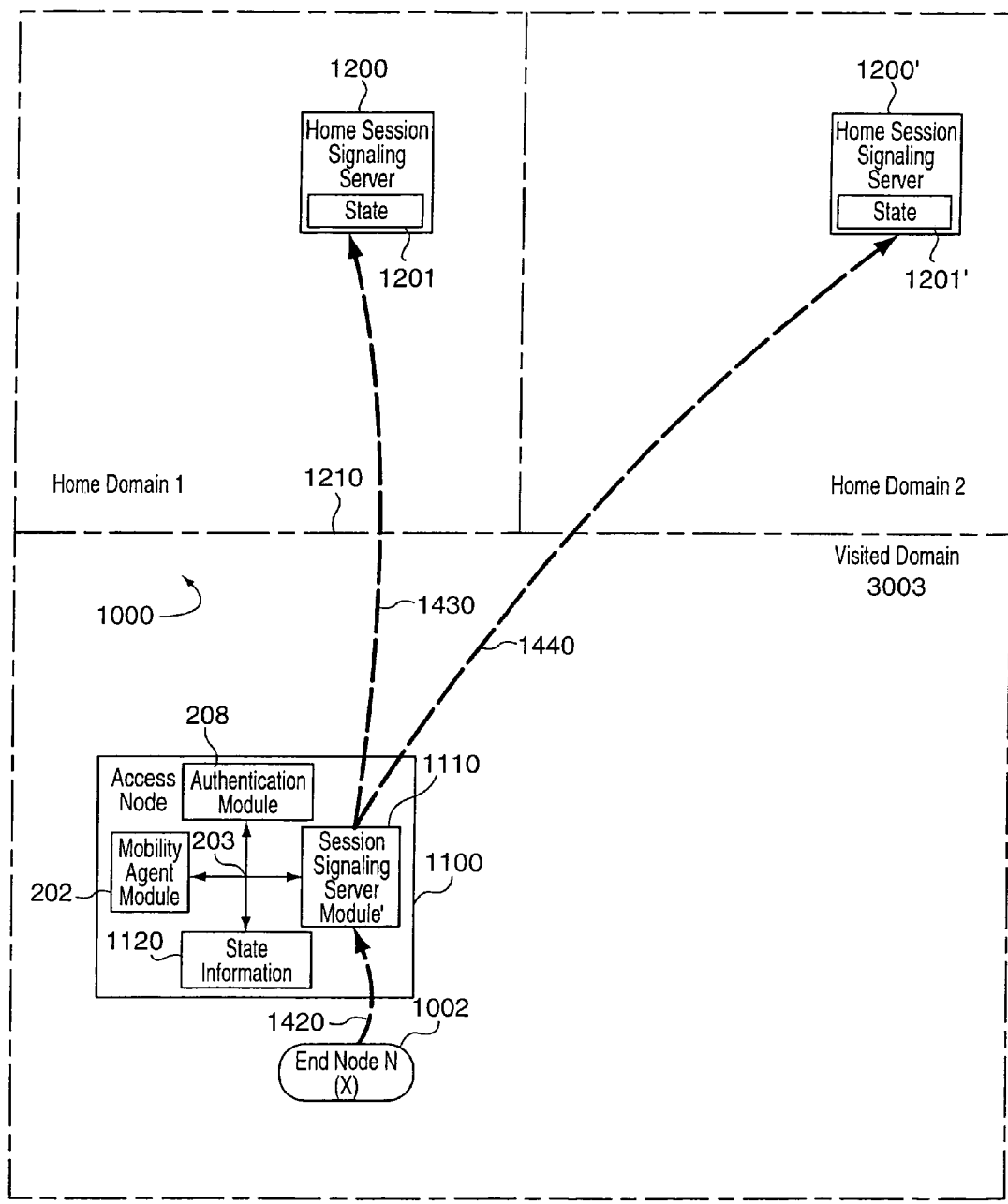
FIGS. 10 is a simplified version of the exemplary system shown in FIG. 7 that illustrates signaling performed for the purpose of end node registration to multiple home session signaling servers via an access node by means of an aggregated registration.

FIG. 10 illustrates a simplified version of the exemplary system 1000 of FIG. 7 and depicts session signaling performed as part of the processes of an aggregated registration of the forwarding address of end node X 1002 to a two home session signaling server 1200, 1200' via access node 1100. The message processing involves a Register message broad-

TABLE 3

| REGISTER | MESSAGE CONTENT | | |
|---|---|---|---|
| MESSAGE | Target | Record | Contact |
| Message 1400 from MN addressed to AN | Home Session Signaling Server Address<br>User = NULL | Home Session Signaling Address of ENx<br>User = user of ENx | Forwarding Session Signaling Address of ENx<br>User = Home Session Signaling address of ENx<br>(User = user of ENx,<br>Domain = domain of HSSSN) |
| | Domain = domain of HSSSN<br>Example:<br>Home1.com | Domain = domain of HSSSN<br>Example:<br>ENx@Home1.com | Domain = Network Address of access node 1100<br>Example:<br>ENx%Home1.com@20.0.0.1 |
| AN inspects, keeps state and forwards message 1410 as is to HSSSN | Home Session Signaling Server Address<br>User = NULL | Home Session Signaling Address of ENx<br>User = user of ENx | Forwarding Session Signaling Address of ENx<br>User = Home Session Signaling address of ENx<br>(User = user of ENx,<br>Domain = domain of HSSSN) |
| | Domain = domain of HSSSN<br>Example:<br>Home1.com | Domain = domain of HSSSN<br>Example:<br>Home1.com | Domain = Network Address of access node 1100<br>Example:<br>ENx%Home1.com@20.0.0.1 |

The REGISTER message 1400 (shown in Table 3) includes the access node's 1100 network address. In one embodiment of this invention, as part of the processing performed by the access node's session signaling server module 1110 in response to receiving the Register message address to the access node 1100, the contact field is translated to a session signaling address resulting from the amendment of the access node's 1100 network address to the end node X 1002 session signaling address. The exemplary message 1410 resulting from such processing is shown in cast operation performed by access node 1100 in accordance with an embodiment of the present invention. In the FIG. 10 example, the methods of processing and transmitting register messages described above in regard to FIG. 9 are applied to the transmission of registration information from an access node to a plurality of home session signaling servers without the need for the end node 1002 to transmit multiple registration messages, one per home session signaling server in which registration information is to be stored. This embodiment offers the advantage of efficiently using radio bandwidth, a valuable resource, which is used to communicate register messages between end node 1002 and access node 1100. It does this by allowing one register message 1420 to serve the purpose of multiple messages.

Table 4 shows the aggregated Register message 1420 which will be generated in such an embodiment in the first row of the table and the individual Register messages 1430 and 1440 which will be generated by the access node 1100 in the second row and third row respectively.

The REGISTER message 1400 (shown in Table 3) includes the access node's 1100 network address in the contact field. It also includes in then record field both of the addresses of the end node X 1002 that correspond to the home session signaling servers 1200 and 1200'. In one embodiment of this invention, as part of the processing performed by the access node's session signaling server module 1110 in response to receiving the Register message with multiple addresses in the record field, two individual messages are generated, one for each address. The REGISTER message 1430 is shown in the second row of Table 4 and includes the address of End Node X 1002 corresponding to the home session signaling server 1200 in the record field. The REGISTER message 1440 is shown in the third row of Table 4 and includes the address of End Node X 1002 corresponding to the home session signaling 1200' in the record field. For each of the REGISTER messages 1430, 1440 the contact field includes a concatenation of the End Node's X 1002 address from the corresponding home session signaling servers 1200 or 1200' and the address of the access node 1100, which makes the identifiers unique in both the home session signaling server state 1201, 1201' and in the access node state 1120.

TABLE 4

| REGISTER MESSAGE | MESSAGE CONTENT | | |
|---|---|---|---|
| | Target | Record | Contact |
| Message 1420 from MN addressed to AN | Home Session Signaling Server Address<br>User = NULL<br>Domain = domain of HSSSN<br>Example:<br>Home1.com | Home Session Signaling Address 1 of ENx<br>User = user of ENx<br>Domain = domain of HSSSN1<br>Example:<br>ENx@Home1.com<br>Home Session Signaling Address 2 of ENx<br>User = user of ENx 1002<br>Domain = domain of HSSSN2<br>Example:<br>ENx@Home2.com | Forwarding Session Signaling Address of ENx<br>User = user of ENx<br>Domain = Network Address of access node 1100<br>Example:<br>ENx@20.0.0.1 |
| Message 1430 from AN addressed to HSSSN 1 | Home Session Signaling Server 1 Address<br>User = NULL | Home Session Signaling Address 1 of ENx<br>User = user of ENx | Forwarding Session Signaling Address of ENx<br>User = Home Session Signaling address 1 of ENx<br>(User = user of ENx, Domain = domain of HSSSN1) |
| | Domain = domain of HSSSN1<br>Example:<br>Home1.com | Domain = domain of HSSSN1<br>Example:<br>ENx@Home1.com | Domain = Network Address of access node 1100<br>Example:<br>ENx%Home1.com@20.0.0.1 |
| Message 1440 From AN addressed to HSSSN 2 | Home Session Signaling Server 2 Address<br>User = NULL | Home Session Signaling Address 2 of ENx<br>User = user of ENx | Forwarding Session Signaling Address 2 of ENx<br>User = Home Session Signaling address of ENx (User = user of ENx, Domain = domain of HSSSN2) |
| | Domain = domain of HSSSN2<br>Example:<br>Home2.com | Domain = domain of HSSSN2<br>Example:<br>ENx@Home2.com | Domain = Network Address of access node 1100<br>Example:<br>ENx%Home2.com@20.0.0.1 |

Table 5 illustrates the state information obtained by the home session signaling servers 1201, 1201' in the first and second row respectively and the access node state information 1120 in the third row. The latter includes two sub-records, one for each address of End Node X 1002, both pointing to the same directly connected network address of End Node X in the forwarding address.

TABLE 5

STATE INFORMATION

| Element | Record | Forwarding Address |
| --- | --- | --- |
| Home Session Signaling Server 1 State 1201 | User = user of ENx<br><br>Domain = domain of HSSSN1<br>Example:<br>Home2.com | User = Home Session Signaling address 1 of ENx (User = user of ENx, Domain = domain of HSSSN1)<br>Domain = Network Address of access node 1100<br>Example:<br>ENx%Home2.com@20.0.0.1 |
| Home Session Signaling Server 2 State 1201' | User = user of ENx<br><br>Domain = domain of HSSSN2<br>Example:<br>Home2.com | User = Home Session Signaling address 2 of ENx (User = user of ENx, Domain = domain of HSSSN2)<br>Domain = Network Address of access node 1100<br>Example:<br>ENx%Home2.com@20.0.0.1 |
| Access Node State Information 1120 | User = Home Session Signaling address 1 of ENx (User = user of ENx, Domain = domain of HSSSN1) Domain = Network Address of acccess node 1100<br>Example:<br>ENx%Home1.com@20.0.0.1<br>AND<br>User = Home Session Signaling address 2 of ENx (User = user of ENx, Domain = domain of HSSSN2) Domain = Network Address of access node 1100<br>Example:<br>ENx%Home2.com@20.0.0.1 | Network address of directly connected ENx<br><br><br><br><br><br><br>Example:<br>10.0.0.1 |

In alternative embodiments of the present invention an End node X 1002 registers with a plurality of home session signaling servers and not just two. The same aggregated registration method given in the example above is used for that purpose.

Figure 11:
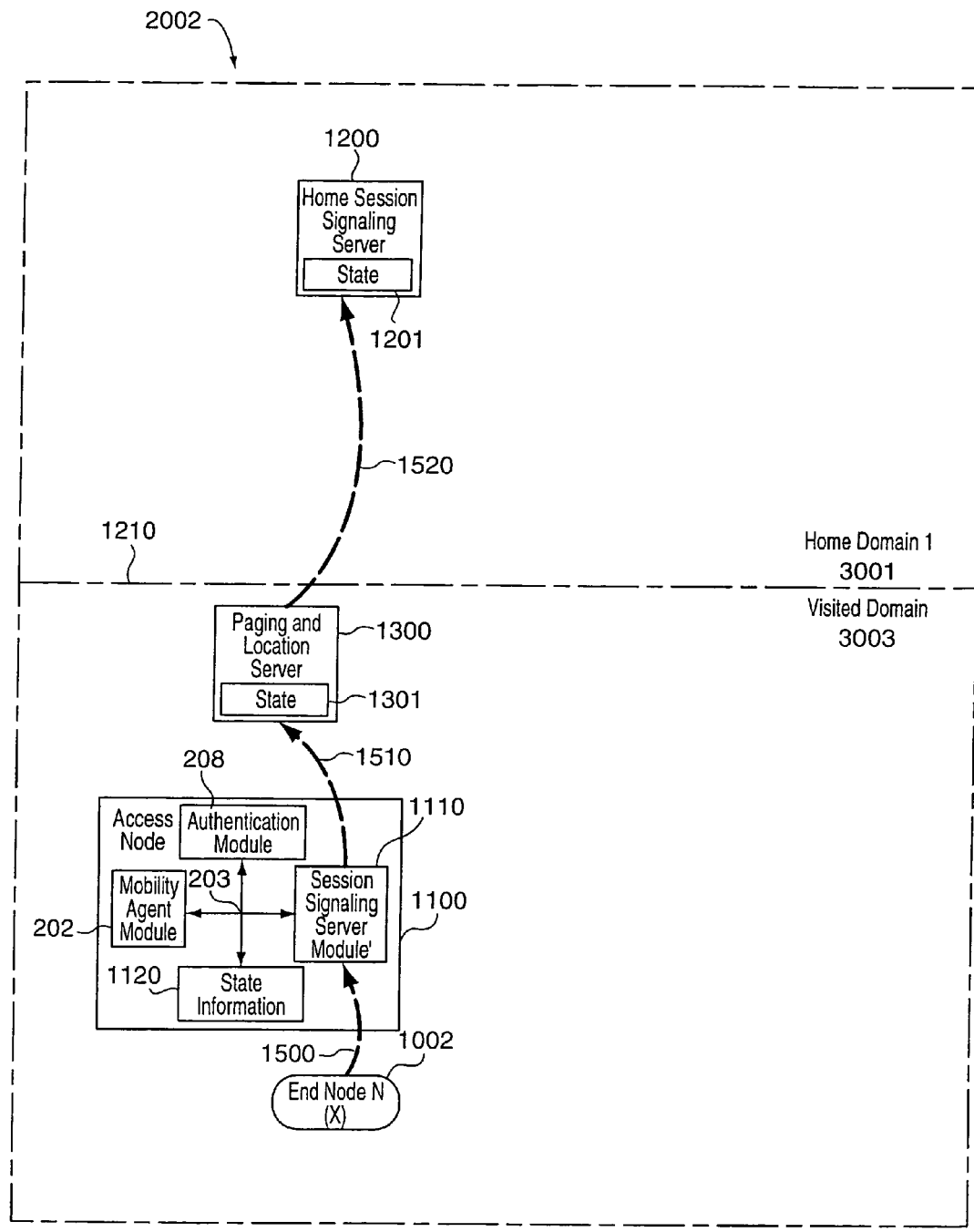
FIGS. 11 is a simplified version of the exemplary system shown in FIG. 8 that illustrates signaling performed for the purpose of end node registration to a home session signaling server via chained registration to an access node and a paging and location server.

FIG. 11 illustrates a simplified version of the exemplary system 2002 of FIG. 8 and depicts session signaling performed as part of the processes of a chained registration of the forwarding address of end node X 1002 to a paging and location server 1300 and a home session signaling server 1200 via access node 1100. In accordance with a first signaling method of the present invention end node X 1002 is not aware of the presence of the proxy and location server 1300 or the signaling server module 1110 in the access node 1100. The signaling associated with such an embodiment is shown in FIG. 11.

In the FIG. 11 embodiment, in order to register its location with its Home session signaling server 1200, end node X 1002 sends a REGISTER message 1500 directed to the network address of the home session signaling server node 1200. Since the access node serves as the mobile node's point of network attachment, this message is routed through access node 1100 where it is processed. In one embodiment, the session signaling server module 1110 modifies the received message 1500 by performing a translation operation to the contact field of the received message 1500 changing its value to a value that includes the access node's 1100 network address. In one particular embodiment, the contact field is translated to become a session signaling address that is the result of amending the access node's 1100 network address to the session signaling address of end node X 1002.

In accordance with the present invention, Paging and Location Server 1300 monitors for messages sent to it and, in response to detecting such a message intercepts and processes the message. In particular the Paging and Location Server 1390 processes the received message to generate one or more new Register messages there from. The Server 1300 also stores relevant address information in its set of State information 1301.

In accordance with the embodiment shown in FIG. 11, the paging and location server 1300 generates and transmits a new register message 1520 to the home session signaling server 1200. In one embodiment, the paging and location server 1300 modifies the received message 1510 by performing a translation operation to the contact field of the received message 1510 changing its value to a value that includes the session signaling address of the paging and location server 1300. In one particular embodiment, the contact field is translated to become a session signaling address that is the result of amending the session signaling address of the paging and location server 1300 to the session signaling address of end node X 1002.

TABLE 6

| REGISTER MESSAGE | MESSAGE CONTENT | | |
|---|---|---|---|
| | Target | Record | Contact |
| Message 1500 from ENx addressed to HSSSN | Home Session Signaling Server Address | Home Session Signaling Address of ENx | Forwarding Session Signaling Address of ENx with domain part equal to network address of ENx |
| | User = NULL<br>Domain = domain of HSSSN<br>Example:<br>Home1.com | User = user of ENx<br>Domain = domain of HSSSN<br>Example:<br>Home1.com | User = user of ENx<br>Domain = Network Address of ENx<br>Example:<br>ENx@10.0.0.1 |
| AN Intercepts, Modifies Contact field and forwards message 1510 addressed to PLS | Home Session Signaling Server Address | Home Session Signaling Address of ENx | Forwarding Session Signaling Address of ENx |
| | User = NULL | User = user of ENx | User = Home Session Signaling address of ENx (User = user of ENx, Domain = domain of HSSSN) |
| | Domain = domain of HSSSN<br>Example:<br>Home1.com | Domain = domain of HSSSN<br>Example:<br>Home1.com | Domain = Network Address of access node 1100<br>Example:<br>ENx%Home1.com@20.0.0.1 |
| PLS Modifies Contact field and forwards message 1520 addressed to HSSSN | Home Session Signaling Server Address | Home Session Signaling Address of ENx | Forwarding Session Signaling Address of ENx |
| | User = NULL | User = user of ENx | User = Home Session Signaling address of ENx (User = user of ENx, Domain = domain of HSSSN) |
| | Domain = domain of HSSSN<br>Example:<br>Home1.com | Domain = domain of HSSSN<br>Example:<br>Home1.com | Domain = domain of PLS<br>Example:<br>ENx%Home1.com@PLS.com |

Table 6 shows the aggregated Register message 1500 which will be generated in such an embodiment in the first row of the table and the Register messages 1510 and 1520 which will be generated by the access node 1100 and the paging and location server 1300 in the second row and third row respectively.

The REGISTER message 1500 (shown in Table 6) includes the home session signaling server 1200 address in the Target field, the session signaling address of the End Node X 1002 in the Record field and network address of the End Node X 1002 in the contact field. In one embodiment of this invention, as part of the processing performed by the access node's session signaling server module 1110 in response to intercepting the Register message, the contact field is translated to a session signaling address resulting from the amendment of the access node's 1100 network address to the end node X 1002 session signaling address. The exemplary message 1510 resulting from such processing is shown in the second row to Table 6. It is this message which is transmitted to the paging and location server 1300.

In one embodiment of this invention, as part of the processing performed by the paging and location server 1300 in response to receiving the Register message, the contact field is translated once more to a session signaling address resulting from the amendment of the session signaling address of the paging and location server 1300 to the end node X 1002 session signaling address. The exemplary message 1520 resulting from such processing is shown in the third row to Table 6. It is this message which is transmitted to the paging and location server 1300. The home session signaling server 1200 will processes the received message in the same manner as previously discussed with regard to the Table 2 example. The resultant state in 1201, 1301 and 1120 in this example is illustrated in Table 7. As a result the home session signaling server 1201 will forward any incoming signaling for End Node X 1002 to the paging and location server 1300, which in its turn will forward it to the access node 1100 before being delivered to the End Node X itself.

TABLE 7

| | STATE INFORMATION | | |
|---|---|---|---|
| Element | Record | | Forwarding Address |
| Home Session Signaling Server State 1201 | User = user of ENx | | User = Home Session Signaling address of ENx (User = user of ENx, Domain = domain of HSSSN) |
| | Domain = domain of HSSSN | | Domain = domain of PLS |
| | Example:<br>ENx@Home1.com | | Example:<br>ENx%Home1.com@PLS.com |

TABLE 7-continued

| | STATE INFORMATION | |
|---|---|---|
| Element | Record | Forwarding Address |
| PLS State 1301 | User = Home Session Signaling address of ENx (User = user of ENx, Domain = domain of HSSSN) | User = Home Session Signaling address of ENx (User = user of ENx, Domain = domain of HSSSN) |
| | Domain = domain of PLS | Domain = Network Address of access node 1100 |
| | Example: ENx%Home1.com@PLS.com | Example: ENx%Home1.com@20.0.0.1 |
| Access Node State Information 1120 | User = Home Session Signaling address of ENx (User = user of ENx, Domain = domain of HSSSN) | Network address of directly connected ENx |
| | Domain = Network Address of access node 1100 | |
| | Example: ENx%Home1.com@20.0.0.1 | Example: 10.0.0.1 |

In accordance with a second signaling method of the present invention end node X 1002 is aware of the presence of the proxy and location server 1300 and the signaling server module 1110 in the access node 1100. The signaling associated with such an embodiment is illustrated in FIG. 12.

Figure 12:
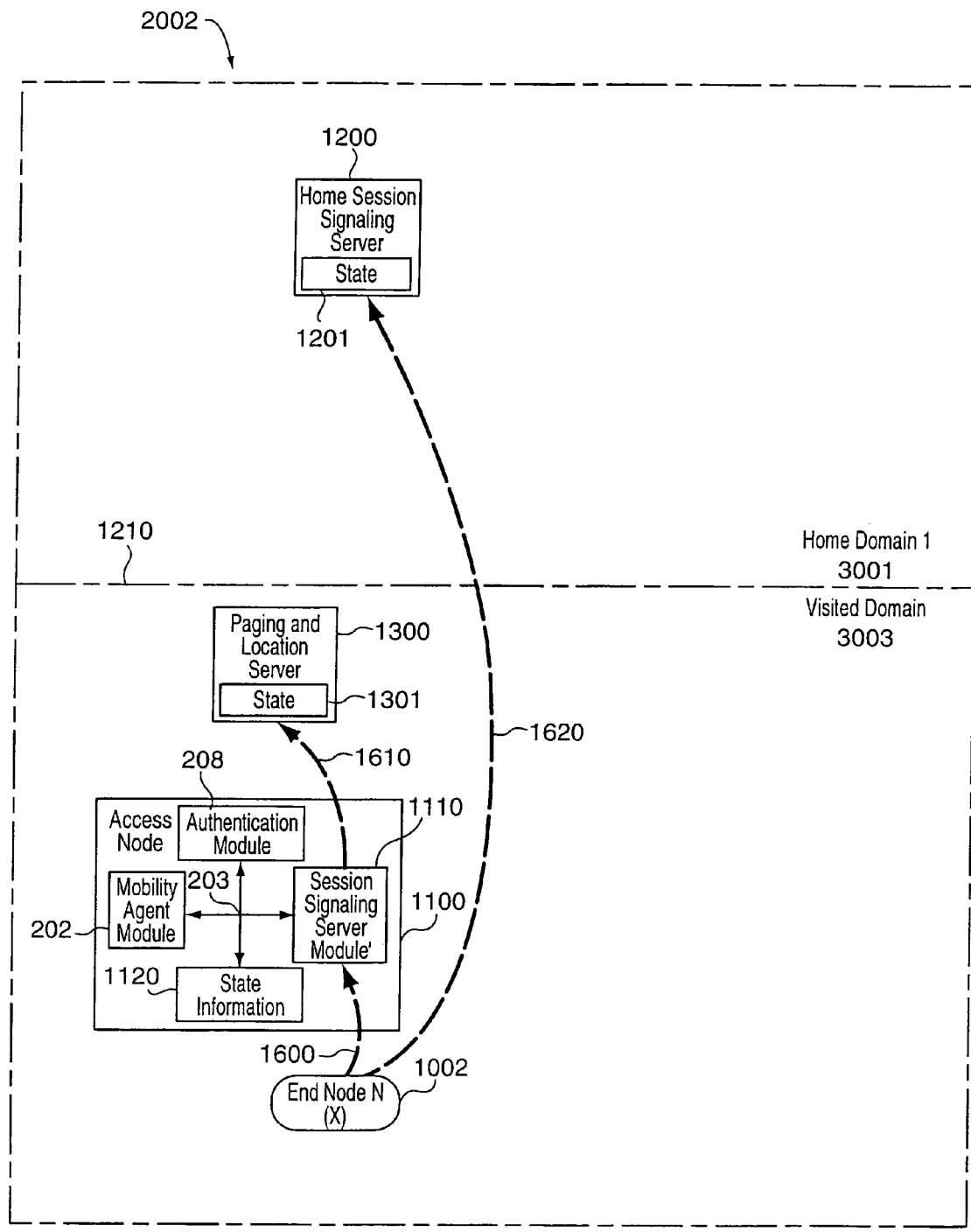
FIGS. 12 is a simplified version of the exemplary system shown in FIG. 8 that illustrates signaling performed for the purpose of end node registration to a home session signaling server via parallel registration to an access node and a paging and location server.

In the FIG. 12 embodiment, in order to register its location with its Home session signaling server 1200, end node X 1002 sends a REGISTER message 1600 directed to the network address of the access node 1100. Said message includes the session signaling address of the paging and location server 1300 in the Target field. The Record field is comprised by an end node X 1002 identifier concatenated with the session signaling address of the paging and location server 1300; this address will now be referred to as the paging and location address of the end node X 1002. In one embodiment of this invention the end node X 1002 identifier is the home session signaling address of the end node X 1002. The contact field includes the same end node X 1002 identifier user in the Record field concatenated by the access node 1100 network address.

The session signaling server module 1110 of said access node receives and processes the message; stores relevant address information in its set of State information 1120 and forwards the message 1610 as is to the paging and location server 1300. In accordance with the present invention, Paging and Location Server 1300 monitors for messages sent to it and, in response to detecting such a message intercepts and processes the message. In particular the Paging and Location Server 1300 stores relevant address information in its set of State information 1301.

In parallel, as depicted in the FIG. 12 embodiment, end node X 1002 also sends a REGISTER message 1620 directed to the home session signaling server 1200. Said message includes the session signaling address of the home session signaling server 1200 in the Target field and the session signaling address of the end node X 1002 in the record field. In one particular embodiment, the contact contains a session signaling address that is the result of amending the session signaling address of the paging and location server 1300 to the session signaling address of end node X 1002 in the paging and location server 1300.

Table 8 shows the messages 1600, 1610 and 1620 generated in such an embodiment in the first, second and third row of the table.

TABLE 8

| REGISTER MESSAGE | MESSAGE CONTENT | | |
|---|---|---|---|
| | Target | Record | Contact |
| Message 1600 from ENx addressed to AN | PLS Address User = NULL Domain = domain of PLS Example: PLS.com | PLS Session Signaling Address of ENx User = user of ENx in PLS Domain = domain of PLS Example: ENx%Home1.com@PLS.com | Forwarding Session Signaling Address of ENx User = user of ENx in PLS Domain = Network Address of access node 1100 Example: ENx%Home1.com@20.0.0.1 |
| AN keeps state and forwards message 1610 addressed to PLS | PLS Address User = NULL Domain = domain of PLS Example: PLS.com. | PLS Session Signaling Address of ENx User = user of ENx in PLS Domain = domain of PLS Example: ENx@PLS.com | Forwarding Session Signaling Address of ENx User = user of ENx in PLS Domain = Network Address of access node 1100 Example: ENx%Home1.com@20.0.0.1 |

TABLE 8-continued

| REGISTER | MESSAGE CONTENT | | |
|---|---|---|---|
| MESSAGE | Target | Record | Contact |
| Message 1620 from ENx addressed to HSSSN | Home Session Signaling Server Address<br>User = NULL<br>Domain = domain of HSSSN<br>Example:<br>Home1.com | Home Session Signaling Address of ENx<br>User = user of ENx<br>Domain = domain of HSSSN<br>Example:<br>ENx@Home1.com | Forwarding Session Signaling Address of ENx<br><br>User = user of ENx in PLS<br>Domain = domain of PLS<br><br>Example:<br>ENx%Home1.com@PLS.com |

The resultant state in 1201, 1301 and 1120 in this example is illustrated in Table 9. As with the state illustrated in FIG. 7 as a result the home session signaling server 1201 will forward any incoming signaling for End Node X 1002 to the paging and location server 1300, which in its turn will forward it to the access node 1100 before being delivered to the End Node X itself, it is now done, however, without need for message interception and translation but only by normal message reception and processing.

TABLE 9

| | STATE INFORMATION | |
|---|---|---|
| Element | Record | Forwarding Address |
| Home Session Signaling Server State 1201 | User = user of ENx<br>Domain = domain of HSSSN<br>Example:<br>ENx@Home1.com | User = user of ENx in PLS<br>Domain = domain of PLS<br>Example:<br>ENx%Home1.com@PLS.com |
| PLS State 1301 | User = user of ENx in PLS<br>Domain = domain of PLS<br>Example:<br>ENx%Home1.com@PLS.com | User = user of ENx in PLS<br>Domain = Network Address of access node 1100<br>Example:<br>ENx%Home1.com@20.0.0.1 |
| Access Node State Information 1120 | User = user of ENx in PLS<br>Domain = Network Address of access node 1100<br>Example:<br>ENx%Home1.com@20.0.0.1 | Network address of directly connected ENx<br><br><br>Example:<br>10.0.0.1 |

Figure 13:
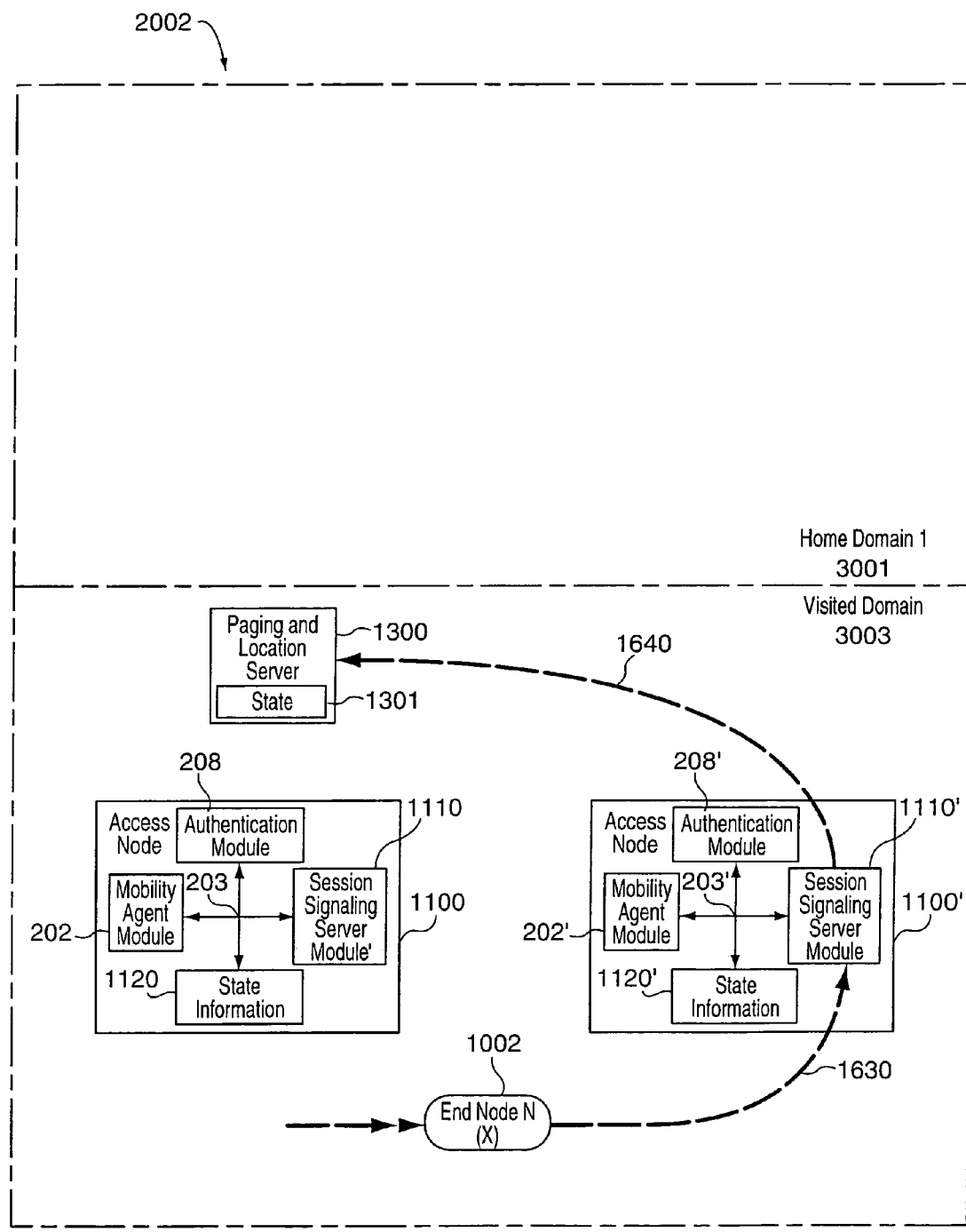
FIGS. 13 is a simplified version of the exemplary system shown in FIG. 8 that illustrates signaling performed for the purpose of end node registration to a paging and location server during a handoff operation.

FIG. 13 illustrates a simplified version of the exemplary system 2002 of FIG. 8 and depicts session signaling performed as part of the processes of a handoff. In this example the end node X 1002 is moving from access node 1100 to access node 1100'. End node X 1002 registers its relocation so that incoming signaling will reach it at its correct location which now is access node 1100'. To that end the end node X 1002 performs a registration equivalent to paging and location server 1300 registration already illustrated by messages 1600, 1610 in FIG. 12 sends REGISTER message 1630 to the network address of access node 1100'. Registration with the home session signaling server 1200 (of FIG. 12) is not required in this case since the said server 1200 correctly forwards any incoming signaling to the paging and location server 1300 based on current state information 1201 (of FIG. 12). The same would apply in the case of aggregated registration as depicted in FIG. 10 i.e.: the existence of a paging and location server in the visited domain eliminates the need for multiple registrations to multiple home session signaling servers.

In the FIG. 13 embodiment, in order to updates its registered location with its paging and location server 1300, end node X 1002 sends a REGISTER message 1630 directed to the network address of the access node 1100'. Said message is similar to message 1600 of (FIG. 12). The difference is that the contact field includes the end node X 1002 identifier used in the Record field concatenated by the access node 1100' network address instead of the access node 1100 network address.

The session signaling server module 1110 of said access node receives and processes the message; stores relevant address information in its set of State information 1120. and forwards the message 1640 as is to the paging and location server 1300. In accordance with the present invention, Paging and Location Server 1300 monitors for messages sent to it and, in response to detecting such a message intercepts and processes the message. In particular the Paging and Location Server 1300 stores relevant address information in its set of State information 1301.

TABLE 10

| REGISTER MESSAGE | MESSAGE CONTENT | | |
|---|---|---|---|
| | Target | Record | Contact |
| Message 1630 from Enx addressed to AN | PLS Address<br>User = NULL<br>Domain = domain of PLS<br>Example: PLS.com | PLS Session Signaling Address of ENx<br>User = User of ENx in PLS<br>Domain = domain of PLS<br>Example: Enx%Home1.com@PLS | Forwarding session signaling Address of ENx<br>User = user of ENx in PLS<br>Domain = Network Address of access node 1100'<br>Example: ENx%Home1.com@20.0.1.1 |
| AN keeps state and forwards message 1640 addressed to PLS | PLS Address<br>User = NULL<br>Domain = domain of PLS<br>Example: PLS.com | PLS Session Signaling Address of ENx<br>User = user of ENx in PLS<br>Domain = domain of PLS<br>Example: ENx%Home1.com@PLS.com | Forwarding Session Signaling Address of ENx<br>User = user of ENx in PLS<br>Domain = Network Address of access node 1100'<br>Example: ENx%Home1.com@20.0.1.1 |

The result is updated state information in access node 1100' and paging and location server 1300. That state is depicted in Table 11.

TABLE 11

| | STATE INFORMATION | |
|---|---|---|
| Element | Record | Forwarding Address |
| PLS State 1301 | User = user of ENx in PLS<br>Domain = domain of PLS<br>Example: ENx%Home1.com@PLS.com | User = user of ENx in PLS<br>Domain = Network Address of access node 1100'<br>Example: ENx%Home1.com@20.0.1.1 |
| Access Node State Information 1120' | User = user of ENx in PLS<br>Domain = Network Address of access node 1100'<br>Example: ENx%Home1.com@20.0.1.1 | Network address of directly connected ENx<br>Example: 10.0.0.1 |

Numerous variations on the above-described inventions will be apparent to those of ordinary skill in the art based on the above description. Such variations are to be considered within the scope of the invention.

What is claimed is:

1. A communications method comprising:
   operating a paging and location server to receive a first registration message from an access node, said access node being a base station, the registration message including an end node session signaling server address and an access node session signaling server address, the access node session signaling server address being included in a forwarding address field of said first registration message; and
   operating the paging and location server to store registration information associating the end node session signaling server address with the access node session signaling server address.

2. The method of claim 1, further comprising:
   operating a home session signaling server node to receive a second registration message, said second registration message including an end node session signaling address and a paging and location server session signaling server address; and
   operating the home session signaling server to store registration information associating said end node session signaling registration address with said paging and location server session signaling server address.

3. The method of claim 2, further comprising:
   operating said paging and location server to generate said second registration message by performing an address translation operation on said first registration message.

4. The method of claim 3, wherein performing an address translation operation further includes:
   amending the session signaling address of the access node included in a forwarding address field of the received first registration message with at least a portion of a session signaling address of the paging and location server.

5. The method of claim 4, wherein said at least a portion of a session signaling address of the paging and location server is a domain part of said session signaling address.

6. The method of claim 3, further comprising:
   operating the access node to receive a third registration message from the end node; and generating the first registration message received by said paging and location server from the third registration message received from the end node.

7. The method of claim 6, wherein operating the access node to generate the first registration message received by said paging and location server includes:
    amending the session signaling address of the end node included in a forwarding address field of the registration message received from the end node with at least a portion of a session signaling address of the access node.

8. The method of claim 7, wherein the amended portion of the session signaling address of the access node is a domain part of the session signaling address.

9. A communications method, comprising:
    operating a first access node to transmit a first session signaling server registration message to a paging and location server to cause the paging and location server to store registration information associating session signaling address information corresponding to an end node with session signaling server address information corresponding to an access node, said first access node being a base station; and
    operating said first access node to transmit a second session signaling server registration message to a home session signaling server node to cause the home session signaling server node to store registration information associating session signaling address information corresponding to said end node and with session signal address information corresponding to said paging and location server.

10. The method of claim 9, wherein the second session signaling server message originates from said end node, the method further comprising:
    operating the first access node to receive said second session signaling server registration message from said end node prior to transmitting the second session signaling server registration message.

11. The communications method of claim 9, further comprising performing a handoff operation to handoff said end node from said first access node to a second access node, the handoff including:
    updating registration information stored in said paging and location server to replace the session signaling address corresponding to the first access node with a session signal server address corresponding to the second access node thereby associating the session signaling address corresponding to the second access node with the session signaling address corresponding to the end node.

12. The method of claim 11, wherein the handoff operation is completed without updating the session signal server information stored by the paging and location server corresponding to said end node.

13. The method of claim 11, further comprising, prior to performing said handoff, operating said first access node to transmit a third session signaling server registration message to an additional home session signaling server node to cause the additional session signaling server node to store registration information associating session signaling address information corresponding to said end node and with session signal address information corresponding to said paging and location server.

14. The method of claim 13, wherein said handoff operation is performed without updating the registration information corresponding to said end node that is stored in said home session signaling server node and said additional home session signaling server node.

15. A communications system, comprising:
    a paging and location server, the paging and location server including:
        i. means for receiving session signaling registration messages; and
        ii. memory including session signaling registration information associating each of a plurality of end node session signaling server addresses with a corresponding access node session signaling server address, said access node session signaling server address being a session signaling address of an access node which is a base station.

16. The communication system of claim 15, further comprising:
    a first home session signaling server coupled to said paging and location server, said first home session signaling server including:
        memory including session signaling registration information associating each of a plurality of end node session signaling server addresses with a session signaling address of said paging and location server.

17. The communication system of claim 16, further comprising:
    a second home session signaling server coupled to said paging and location server, said second home session signaling server including:
        memory including session signaling registration information associating each of a second plurality of end node session signaling server addresses with the session signaling address of said paging and location server.

18. The communication system of claim 17, wherein said first and second home session signaling servers are located in first and second domains and said paging and location server is located in a third domain.

19. The communication system of claim 18, further comprising:
    a first access node coupled to said paging and location server, the first access node being located in said third domain and including means for transmitting end node session signaling registration information to said paging and location server in response to an end node having a home domain corresponding to either of the first or second domains registering with said access node.

20. The communication system of claim 18, further comprising:
    a first access node coupled to said paging and location server, the first access node being located in said third domain and including means for transmitting end node session signaling registration information to said paging and location server in response to an end node having a home domain corresponding to at least one of the first and second domains transmitting a session signaling registration message to said first access node.

21. A computer readable medium embodying computer executable instructions for implementing a communications method, the method comprising:
    operating a paging and location server to receive a first registration message from an access node, said access node being a base station, the registration message including an end node session signaling server address and an access node session signaling server address, the access node session signaling server address being included in a forwarding address field of said first registration message; and operating the paging and location server to store registration information associating the end node session signaling server address with the access node session signaling server address.

22. An apparatus comprising:

a processor configured to:
 operate a paging and location server to receive a first registration message from an access node, said access node being a base station, the registration message including an end node session signaling server address and an access node session signaling server address, the access node session signaling server address being included in a forwarding address field of said first registration message; and
 operate the paging and location server to store registration information associating the end node session signaling server address with the access node session signaling server address.

23. A computer readable medium embodying computer executable instructions for implementing a communications method, the method comprising:

operating a first access node to transmit a first session signaling server registration message to a paging and location server to cause the paging and location server to store registration information associating session signaling address information corresponding to an end node with session signaling server address information corresponding to an access node, said first access node being a base station, and operating said first access node to transmit a second session signaling server registration message to a home session signaling server node to cause the home session signaling server node to store registration information associating session signaling address information corresponding to said end node with session signaling address information corresponding to said paging and location server.

24. An apparatus comprising:

a processor configured to:
 operate a first access node to transmit a first session signaling server registration message to a paging and location server to cause the paging and location server to store registration information associating session signaling address information corresponding to an end node with session signaling server address information corresponding to an access node, said first access node being a base station; and
 operate said first access node to transmit a second session signaling server registration message to a home session signaling server node to cause the home session signaling server node to store registration information associating session signaling address information corresponding to said end node and with session signaling address information corresponding to said paging and location server.

* * * * *